United States Patent
Budd et al.

(10) Patent No.: US 7,024,593 B1
(45) Date of Patent: Apr. 4, 2006

(54) END-TO-END CHECKSUMMING FOR DATABASE ENVIRONMENTS

(75) Inventors: Robin Budd, Seattle, WA (US); Alexandr Veprinsky, Brookline, MA (US); Arieh Don, Newton, MA (US)

(73) Assignee: EMC Corporation, Hopkinton, MA (US)

( * ) Notice: Subject to any disclaimer, the term of this patent is extended or adjusted under 35 U.S.C. 154(b) by 678 days.

(21) Appl. No.: 10/100,520

(22) Filed: Mar. 18, 2002

(51) Int. Cl.
*G06F 11/00* (2006.01)

(52) U.S. Cl. .............................. 714/48; 714/52; 714/49

(58) Field of Classification Search .................... 714/6, 714/42, 48, 49, 50, 52, 54
See application file for complete search history.

(56) References Cited

U.S. PATENT DOCUMENTS

| | | | |
|---|---|---|---|
| 5,206,939 A | | 4/1993 | Yanai et al. |
| 5,392,209 A | * | 2/1995 | Eason et al. .................... 707/3 |
| 5,778,394 A | | 7/1998 | Galtzur et al. |
| 5,845,147 A | | 12/1998 | Vishlitzky et al. |
| 5,857,208 A | | 1/1999 | Ofek |
| 6,182,267 B1 | * | 1/2001 | Kidd et al. .................. 714/807 |
| 6,192,492 B1 | * | 2/2001 | Masiewicz et al. ........... 714/56 |
| 6,343,324 B1 | * | 1/2002 | Hubis et al. ................. 709/229 |
| 2004/0003316 A1 | * | 1/2004 | Meng et al. .................. 714/13 |

OTHER PUBLICATIONS

"Inside Windows NT", Microsoft Press, Helen Custer, Foreword by David N. Cutler, pp. 265-281, 1993.

* cited by examiner

*Primary Examiner*—Nadeem Iqbal
*Assistant Examiner*—Timothy M. Bonura
(74) *Attorney, Agent, or Firm*—Choate, Hall & Stewart LLP

(57) ABSTRACT

Described are techniques used in detection of a data corruption in a computer system. A host issues a write request that includes a checksum value determined in accordance with data associated with the write request. The write request is received by a data storage system that performs data validation using the checksum. If the data validation succeeds, the write operation proceeds. Otherwise, it is determined that the data is corrupt and a checksum error is returned to the issuing host. The host issues a vendor-defined write request operation that includes the checksum as a data field in the request packet sent to the data storage system. Filter drivers are used in obtaining the checksum and modifying the write request packet to specify a vendor-defined write operation if checksumming is enabled for the write operation.

53 Claims, 15 Drawing Sheets

END-TO-END CHECKSUMMING FOR DATABASE ENVIRONMENTS

BACKGROUND

1. Technical Field

This application generally relates to computer data storage, and more particularly to detection of data corruption in connection with computer data storage.

2. Description of Related Art

Computer systems may include different resources used by one or more host processors. Resources and host processors in a computer system may be interconnected by one or more communication connections. These resources may include, for example, data storage devices such as the Symmetrix™ family of data storage systems manufactured by EMC Corporation. These data storage systems may be coupled to one or more host processors and provide storage services to each host processor. An example data storage system may include one or more data storage devices, such as those of the Symmetrix™ family, that are connected together and may be used to provide common data storage for one or more host processors in a computer system.

A host processor may perform a variety of data processing tasks and operations using the data storage system. For example, a host processor may perform basic system I/O operations in connection with data requests, such as data read and write operations and also administrative tasks, such as data backup and mirroring operations.

Host processor systems may store and retrieve data using a storage device containing a plurality of host interface units, disk drives, and disk interface units. Such storage devices are provided, for example, by EMC Corporation of Hopkinton, Mass. and disclosed in U.S. Pat. No. 5,206,939 to Yanai et al., U.S. Pat. No. 5,778,394 to Galtzur et al., U.S. Pat. No. 5,845,147 to Vishlitzky et al., and U.S. Pat. No. 5,857,208 to Ofek. The host systems access the storage device through a plurality of channels provided therewith. Host systems provide data and access control information through the channels to the storage device and storage device provides data to the host systems also through the channels. The host systems do not address the disk drives of the storage device directly, but rather, access what appears to the host systems as a plurality of logical disk units. The logical disk units may or may not correspond to the actual disk drives. Allowing multiple host systems to access the single storage device unit allows the host systems to share data stored therein.

When a host performs a data operation, such as a write operation, using a data storage device, corruption of the data may occur at any one or more different processing points from when data associated with a high level user software application, for example, is actually written to the particular storage location. The data corruption may not be detected until some time later, for example, when an attempt is made to read the corrupted data.

As part of data recovery operations, transaction logs may be used. A computer system may record transaction information associated with read and write transactions, for example, that may be used in the event of a data corruption by "playing back" the transactions associated with the corrupted data. By playing back the transactions associated with a particular device or portion thereof, the corrupted data may be replaced with uncorrupted data.

One drawback with the foregoing is that the playback of transactions may be time consuming. Additionally, data corruptions may go undetected for an unbounded length of time since the detection may not occur until another access, such as a read, of the corrupted data is performed. The amount of transaction "play back" from the transaction log as part of data recovery may increase as the amount of time between the corruption and the detection thereof increases. Using the foregoing, it may be difficult to determine when a data corruption has occurred in a timely manner as well as prevent possible additional data corruptions.

Thus, it may be desirous and advantageous to have an efficient technique which provides for detection of a data corruption in a timely manner.

SUMMARY OF THE INVENTION

In accordance with one aspect of the invention is a method executed in a computer system for detecting a data error associated with a data operation comprising: issuing, by an application, a request for a data operation in connection with a device; determining if said data operation is a write operation having checksumming enabled for a file associated with said write operation; and forming a data packet that includes a checksum and an associated data command if said data operation is a write operation having checksumming enabled; receiving said data packet at a target location; performing, at said target location, a checksum data validation using said checksum and data included in said data packet prior to performing said write operation; and upon determining an error in said checksum data validation, notifying an issuing host.

In accordance with another aspect of the invention is a computer system comprising: a host computer. The host computer comprising: an upper filter driver that includes machine executable code for: determining if a received write request has checksumming enabled; determining one or more checksum values corresponding to data of said write request; and communicating to a lower filter driver said one or more checksum values and an identifier associated with said data if checksumming is enabled. The host computer also includes a file system processing said write request and dividing said data into one or more portions each having a corresponding fragment I/O request and a corresponding fragment identifier; a lower filter driver comprising machine executable code for: receiving a first fragment I/O request; determining, using said fragment identifier and said identifier from said upper filter driver, whether checksumming is enabled for said first fragment I/O request; upon determining that checksumming is enabled, determining a checksum corresponding to a data portion of said first fragment I/O request, and forming a data packet that includes a special checksum function code and said checksum. The host computer also includes a data storage location comprising machine executable code for: performing a checksum data validation using said checksum and data included in said data packet prior to performing a write operation.

In accordance with another aspect of the invention is a method executed in a computer system for detecting a data error associated with a data operation comprising: issuing a request for a data operation in connection with a target location; determining if said data operation is associated with an output area of said target location having checksumming enabled; obtaining a checksum value at a first point in an upper portion of a calling chain of drivers if said checksumming is enabled; notifying a lower filter driver at a point below said first point that checksumming is enabled for said data operation and said associated output area; and forming a command data block in connection with said data operation by said lower filter driver, said command data block including a vendor-unique command in accordance with a first protocol and including a checksum value in accordance with data associated with said data operation.

In accordance with yet another embodiment of the invention is a computer program product for detecting a data error associated with a data operation comprising machine executable code for: issuing, by an application, a request for a data operation in connection with a device; determining if said data operation is a write operation having checksumming enabled for a file associated with said write operation; and forming a data packet that includes a checksum and an associated data command if said data operation is a write operation having checksumming enabled; receiving said data packet at a target location; performing, at said target location, a checksum data validation using said checksum and data included in said data packet prior to performing said write operation; and upon determining an error in said checksum data validation, notifying an issuing host.

In accordance with another aspect of the invention is a computer program product for detecting a data error associated with a data operation comprising machine executable code for: issuing a request for a data operation in connection with a target location; determining if said data operation is associated with an output area of said target location having checksumming enabled; obtaining a checksum value at a first point in an upper portion of a calling chain of drivers if said checksumming is enabled; notifying a lower filter driver at a point below said first point that checksumming is enabled for said data operation and said associated output area; and forming a command data block in connection with said data operation by said lower filter driver, said command data block including a vendor-unique command in accordance with a first protocol and including a checksum value in accordance with data associated with said data operation.

BRIEF DESCRIPTION OF THE DRAWINGS

Features and advantages of the present invention will become more apparent from the following detailed description of exemplary embodiments thereof taken in conjunction with the accompanying drawings in which.

DETAILED DESCRIPTION OF EMBODIMENT(S)

Figure 1:
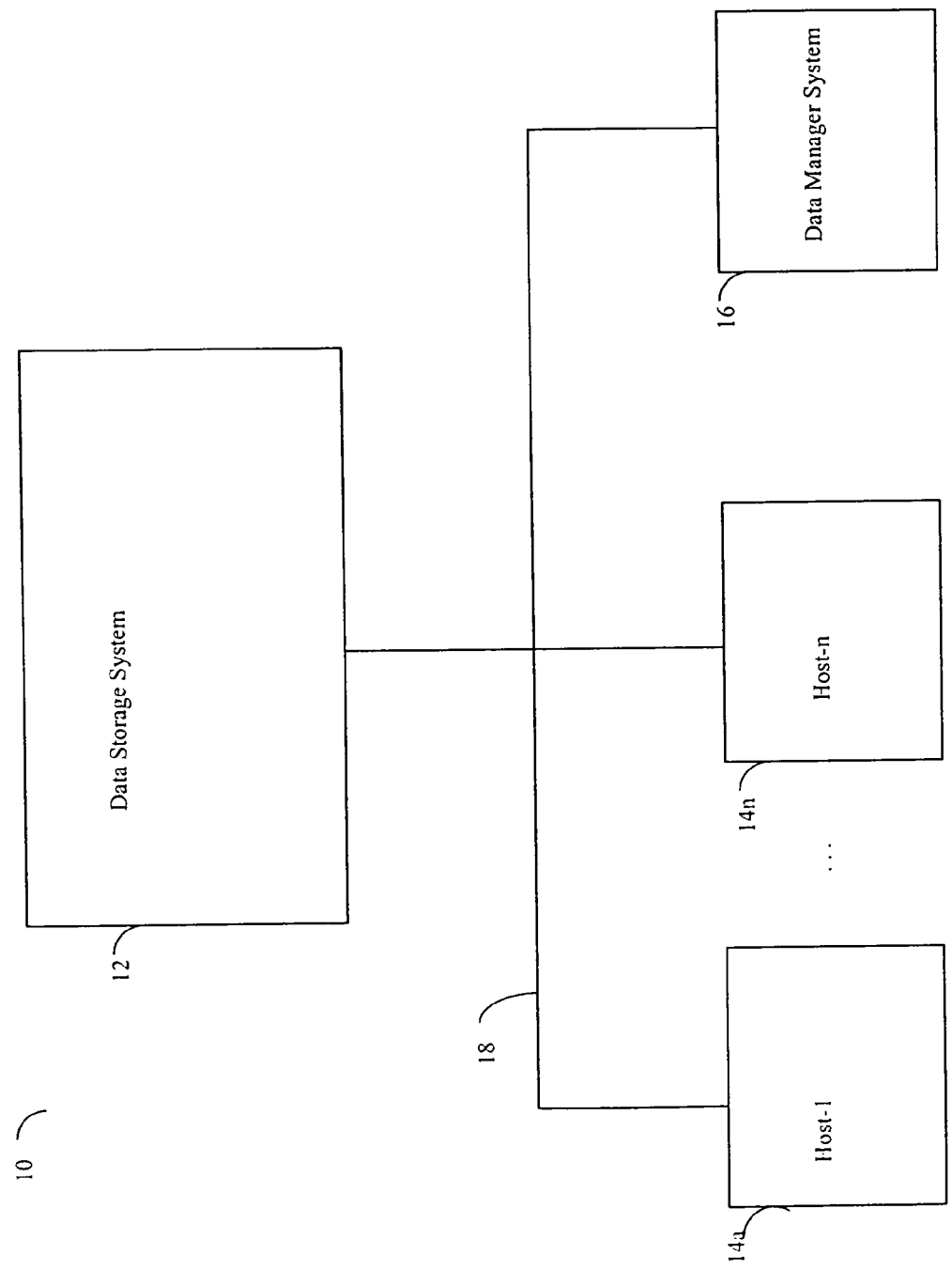
FIG. 1 is an example of an embodiment of a computer system according to the present invention.

Referring now to FIG. 1, shown is an example of an embodiment of a computer system according to the present invention. The computer system 10 includes a data storage system 12 connected to host systems 14a–14n, and a data manager system 16 through communication medium 18. In this embodiment of the computer system 10, the N hosts 14a–14n and the data manager system 16 may access the data storage system 12, for example, in performing input/output (I/O) operations or data requests. The communication medium 18 may be any one of a variety of networks or other type of communication connections as known to those skilled in the art. The communication medium 18 may be a network connection, bus, and/or other type of data link, such as a hardwire or other connections known in the art. For example, the communication medium 18 may be the Internet, an intranet, network or other connection(s) by which the host systems 14a–14n, and the data manager system may access and communicate with the data storage system 12, and may also communicate with others included in the computer system 10.

Each of the host systems 14a–14n, the data manager system 16, and the data storage system 12 included in the computer system 10 may be connected to the communication medium 18 by any one of a variety of connections as may be provided and supported in accordance with the type of communication medium 18. The processors included in the host computer systems 14a–14n and the data manager system 16 may be any one of a variety of commercially available single or multi-processor system, such as an Intel-based processor, IBM mainframe or other type of commercially available processor able to support incoming traffic in accordance with each particular embodiment and application.

It should be noted that the particulars of the hardware and software included in each of the host systems 14a–14n and the data manager system 16, as well as those components that may be included in the data storage system 12 are described herein in more detail, and may vary with each particular embodiment. Each of the host computers 14a–14n, as well as the data manager system 16, may all be located at the same physical site, or, alternatively, may also be located in different physical locations. Examples of the communication medium that may be used to provide the different types of connections between the host computer systems, the data manager system, and the data storage system of the computer system 10 may use a variety of different communication protocols such as SCSI(Small Computer System Interface), ESCON, Fibre Channel, or GIGE (Gigabit Ethernet), and the like. Some or all of the connections by which the hosts, data manager system 16 and data storage system 12 may be connected to the communication medium 18 may pass through other communication devices, such as a Connectrix or other switching equipment that may exist such as a phone line, a repeater, a multiplexer or even a satellite.

Each of the host computer systems as well as the data manager system may perform different types of data operations in accordance with different types of administrative tasks. In the embodiment of FIG. 1, any one of the host computers 14a–14n may issue a data request to the data storage system 12 to perform a data operation. For example, an application executing on one of the host computers 14a–14n may perform a backup, mirroring or other administrative operation and may do so while performing data requests to the data storage system 12.

Figure 2:
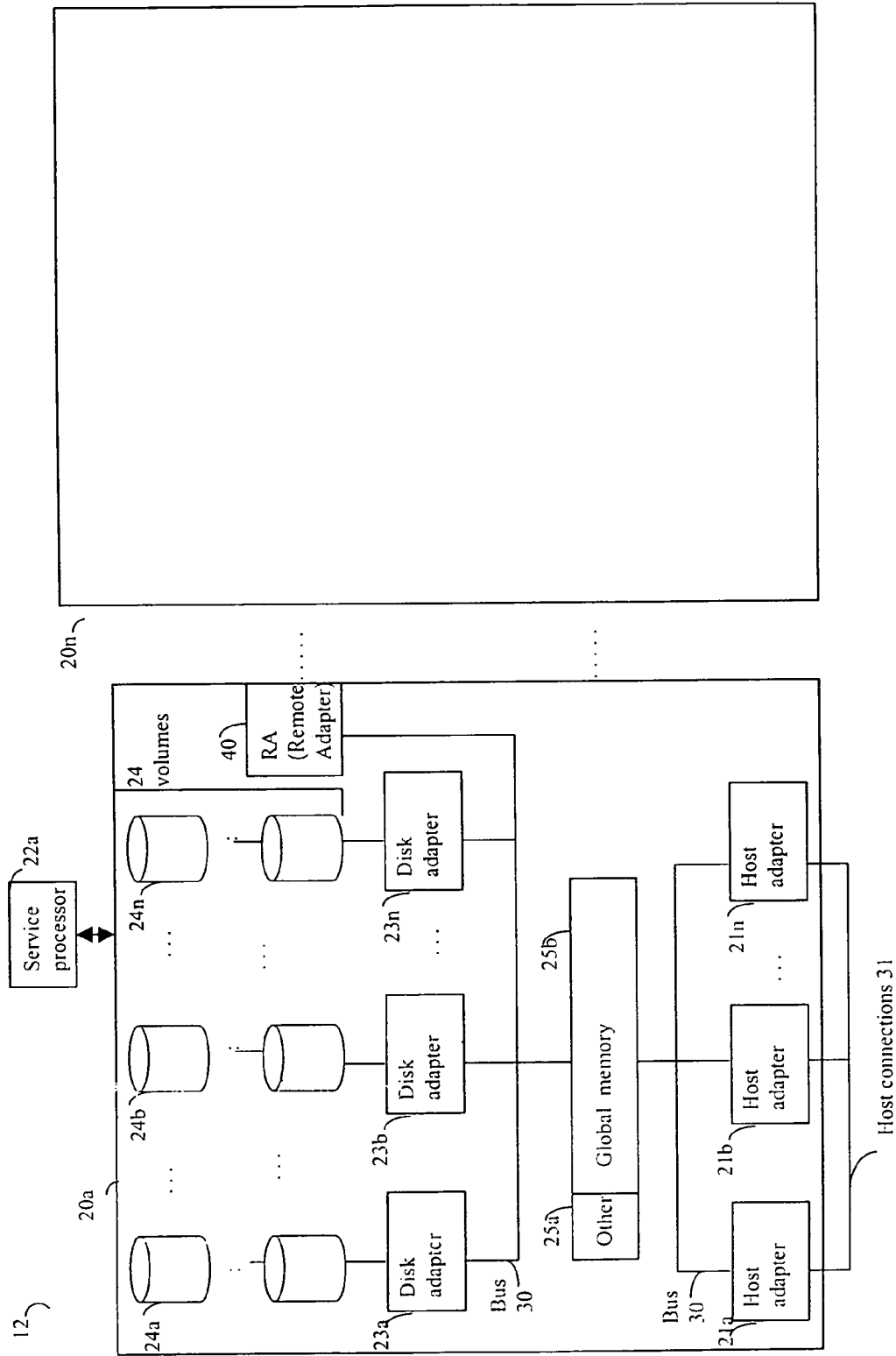
FIG. 2 is an example of an embodiment of a data storage system.

Referring now to FIG. 2, shown is an example of an embodiment of the data storage system 12 that may be included in the computer system 10 of FIG. 1. Included in the data storage system 12 of FIG. 2 are Symmetrix™ storage systems 20a–20n as manufactured by EMC Corporation of Hopkinton, Mass. In this particular example, each of the Symmetrix™ storage systems 20a–20n may be interconnected (not shown) as well as connected to the host and data manager systems through any one or more communication connections 30 that may vary with each particular embodiment and device in accordance with the different protocols used in a particular embodiment. Additionally, the type of communication connection used may vary with certain system parameters and requirements, such as those related to bandwidth and throughput required in accordance with a rate of I/O requests as may be issued by the host computer systems, for example, to the data storage system 12. In this example as described in more detail in following paragraphs, reference is made to the more detailed view of element 20a. It should be noted that a similar more detailed description may also apply to any one or more of the other elements, such as 20n, but have been omitted for simplicity of explanation. It should also be noted that an embodiment may include other types of data storage systems in combination with one or more Symmetrix™ systems. Each of 20a–20n may be resources included in an embodiment of the computer system 10 to provide storage services to, for example, host computer systems and/or the data manager system.

Each of the Symmetrix™ systems, such as 20a, may include a plurality of disk devices or volumes, such as the arrangement 24 consisting of n rows of disks or volumes 24a–24n. In this arrangement, each row of disks or volumes may be connected to a disk adapter ("DA") or director responsible for the backend management of operations to and from a portion of the disks or volumes 24. In the Symmetrix™ system 20a, a single DA, such as 23a, may be responsible for the management of a row of disks or volumes, such as row 24a. Each of the DAs 23a–23n are connected, for example, by a bus 30 to a cache that includes a particular portion designated as global memory 25b. The DAs 23a–23n may perform data operations to and from the cache that may be included in the global memory 25b, for example, in communications with other disk processors or directors, and other components of the system 20a. Generally, the global memory 25b may be used in facilitating communications between components in the system 20a. The other portion 25a is that portion of memory that may be used in connection with other designations that may vary in accordance with each embodiment.

An embodiment of the Symmetrix™ system 20a may include a service processor 22a used to manage and monitor the system 20a. In one embodiment, the service processor 22a may be used in collecting performance data, for example, regarding the I/O performance in connection with system 20a. This performance data may relate to, for example, performance measurements in connection with a data request as may be made from the different host computer systems 14a–14n. This performance data may be gathered and stored, for example, in the global memory and/or other storage area.

The system 20a may also include one or more host adapters ("HAs") or directors 21a–21n. Each of these HAs may be used to manage communications and data operations between one or more host systems and the global memory.

The particular data storage system as described in this embodiment, such as a Symmetrix™ system by EMC Corporation or a disk, should not be construed as a limitation. Other types of commercially available data storage systems, as well as processors and hardware controlling access to these particular devices, may be also be included in an embodiment.

Also shown in the storage system 20a is an RA or remote adapter 40. The RA may be hardware including a processor used to facilitate communication between data storage systems, such as between two Symmetrix data storage systems. The RA may be used with the Remote Data Facility (RDF) product provided by EMC Corporation of Hopkinton, Mass.

Host systems provide data and access control information through channels to the storage systems, and the storage systems may also provide data to the host systems also through the channels. The host systems do not address the disk drives of the storage systems directly, but rather access to data may be provided to one or more host systems from what the host systems view as a plurality of logical devices or logical volumes (LVs). The LVs may or may not correspond to the actual disk drives. For example, one or more LVs may reside on a single physical disk drive. Data in a single storage system may be accessed by multiple hosts allowing the hosts to share the data residing therein. The HAs may be used in connection with communications between a Symmetrix data storage system and a host system. The RAs may be used in facilitating communications between two Symmetrix data storage systems. The DAs may be used in connection with facilitating communications to the associated disk drive(s) and LV(s) residing thereon.

The DA may cause I/O operations to be performed on a volume or device. In the following description, data may be accessed by LV in which a single DA manages data requests in connection with I/O operations in connection with multiple LVs that may reside on a disk. The DA may accomplish this by creating job records for the different LVs associated with the particular DA. These different job records may be associated with the different LVs in a data structure stored and managed by each DA.

Figure 3:
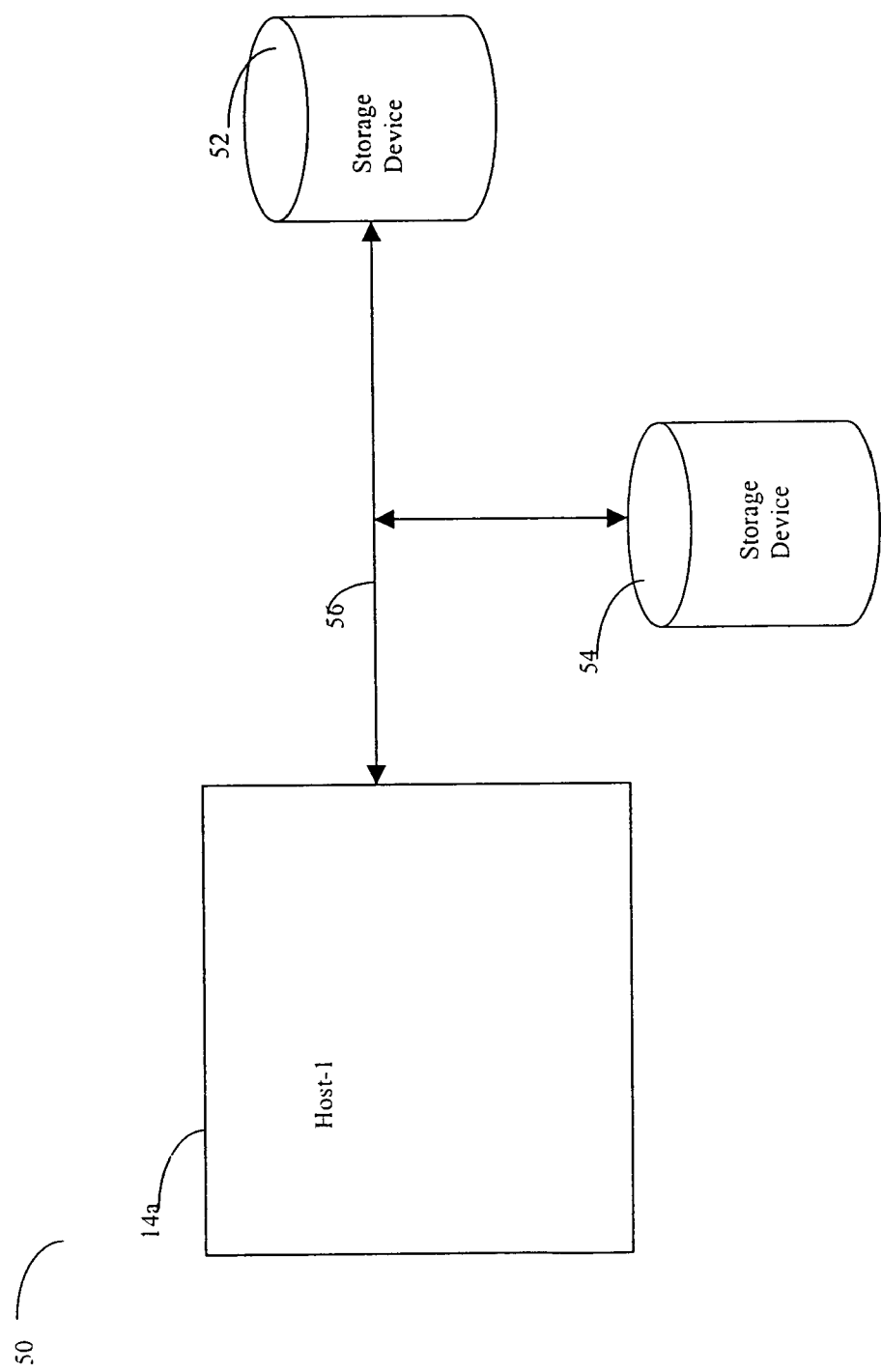
FIG. 3 is an example of an embodiment of a host performing I/O operations to a data storage device with a transaction log on another data storage device included in the system of FIG. 1.

Referring now to FIG. 3, shown is an example of an embodiment 50 of a host that may perform I/O operations, for example, in connection with a storage device that may be included in the data storage system 12 previously described herein. It should be noted that the illustration 50 includes particular components that may be included in an embodiment of the computer system of FIG. 1. Other components may also exist, however, only those components used in connection with the following description are included for simplification.

A host computer system, such as host 14a, may perform an I/O request to a storage device, such as storage device 52.

Additionally, as host computer system 14*a* performs the I/O operation to the storage device 52 over communication connection 56, information about the particular I/O operation may be recorded in a transaction log. The transaction log may be stored in another data storage device, such as storage device 54. It should be noted that the communication connection 56 used to facilitate communications between the host 14*a* and any one of or more of the data storage devices, such as 52 and 54, may be similar to the communication connection 18 previously described in connection with the system 10 of FIG. 1. The data storage devices 52 and 54 may be included in the data storage system 12 or at another location to which the host 14*a* is connected.

Figure 4:
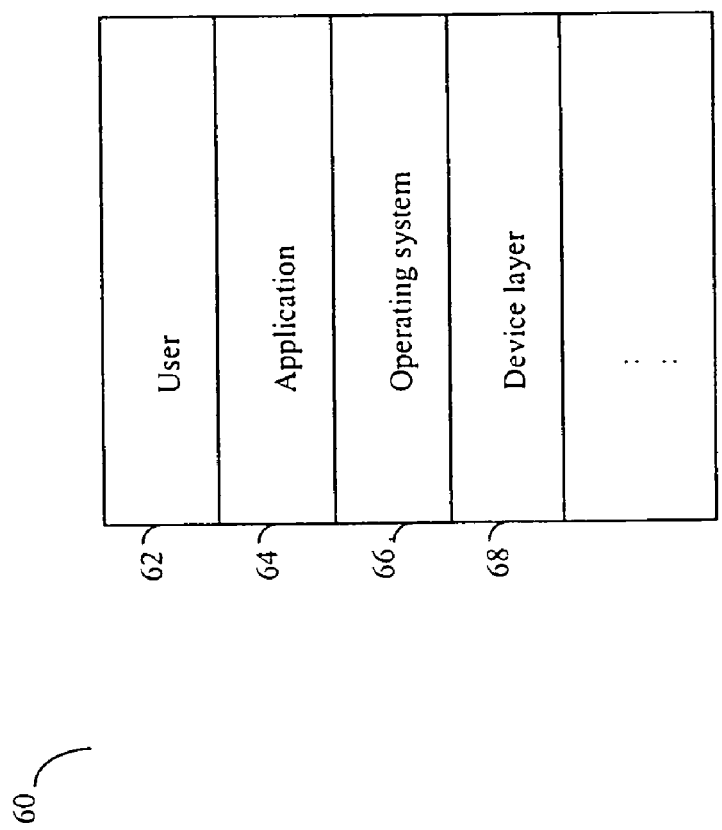
FIG. 4 is an example of software layers that may be included in an embodiment of the host computer system when making an I/O request.

Referring now to FIG. 4, shown is an example of an illustration of the different layers of software that may be used in an embodiment when performing an I/O request between the host and the data storage device 52. One or more drivers included in each layer may be used in connection with processing the I/O request.

As will be described herein, an embodiment of a host computer system may include the Windows NT™ operating system and associated software by Microsoft Corporation of Redmond, Wash. An embodiment may include other types of operating systems and associated software besides the Windows NT operating system as described herein. However, the principles and techniques described herein may be generally applied in accordance with each particular implementation and embodiment.

The Windows NT operating system includes performing I/O processing for file based devices or other requests using layered drivers as will be described with reference to 60 of FIG. 4. The illustration 60 of FIG. 4 includes a user layer 62, an application layer 64, an operating system layer 66, and device layer 68. It should be noted that other embodiments may include a different number and arrangement of layers and associated drivers than as shown in 60 of FIG. 4. Generally, the user software 62 may be characterized as a very high level user program making use of application software associated with the application layer 64. Application software 64 may include, for example, software that converts files for use with a particular database such as SQL. Generally, the application software 64 may be customized for a particular user and system. The application layer 64 may interface with different types of operating system software 66 to provide the files to the device layer 68. The device layer 68 includes drivers for different types of devices. Each of the drivers knows how a particular device operates and interfaces directly with such devices. Generally, the device driver and other device-specific software and operating system software may be bundled with a particular operating system such as a version of Microsoft Windows. The software associated with the layers 64 and 62, the application and user layers respectively, may be layered upon that which is included within the operating system.

An I/O request may be initiated by the user layer 62 and travel down through to the device layer 68 to the connection and subsequently communicated to one or more data storage devices using a communication connection, such as the connection 56 previously described herein.

It should be noted that as described herein, I/O requests may include basic operations such as a read operation, for example, in which a user may query a device to read data, or a write operation, for example, to input new data or overwrite existing data. The techniques described herein may be particularly useful in connection with processing write I/O requests.

Buffered and unbuffered I/O operations may be performed in an embodiment that includes the Windows NT operating system. In connection with buffered operations, information is copied to the kernel space buffer and cached. The file system does the caching of data by making a copy of the data from a buffer in kernel space. In connection with unbuffered I/O operations, the file system does no caching. For unbuffered I/O operations, there is a risk that the data buffer may be corrupted or written over since the data buffer is accessible to the application until the data is actually written out to the device. Therefore, the application and the driver may have access to the same portion of memory at the same time and one may overwrite the data without the other knowing. For this reason, an embodiment may rather use buffered I/O operations in connection with the NT operating system rather than using unbuffered I/O operations as described herein. However, there may be instances in which only unbuffered I/O operations may be performed increasing the likelihood of data corruption and thus the desire for timely and efficient data corruption detection.

Figure 5:
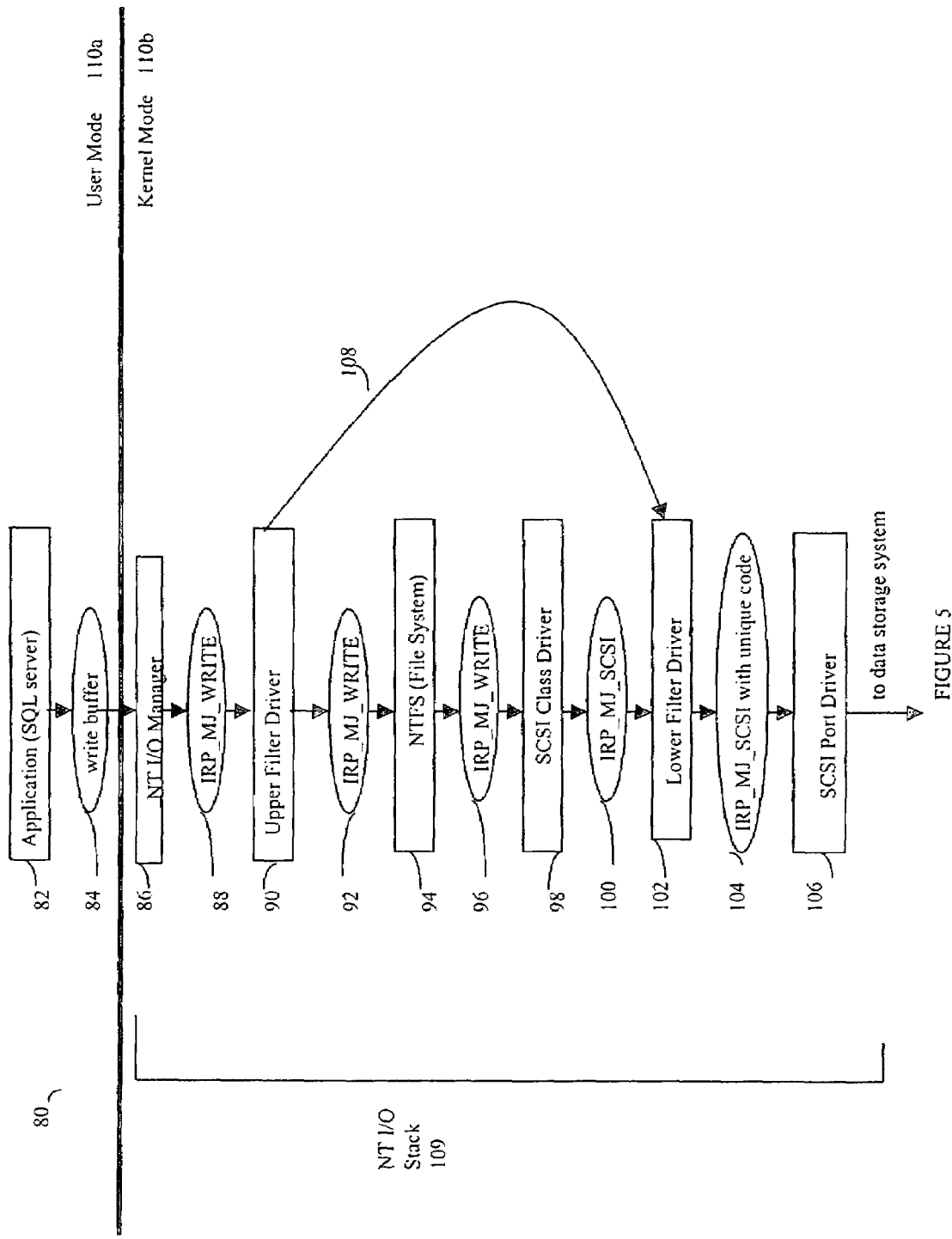
FIG. 5 is a more detailed diagram illustrating processing steps through different layers of software when making an I/O request.

Referring now to FIG. 5, shown is a more detailed example 80 of how an I/O request may be handled in connection with device drivers and other software associated with the different layers previously described and illustrated in FIG. 4. A user program (user level software) may issue an I/O request to an application 82 (application level). As previously described, this software 82 may be a portion of software associated with SQL used in connection with performing an I/O operation to an SQL database stored on a data storage device in the data storage system 12 of FIG. 1. In connection with the I/O operation, the application software 82 may create a data buffer, such as the write buffer 84, which is passed to the NT I/O manager 86.

The NT I/O manager 86 is an operating system component executing in kernel mode which receives the request and creates an I/O request packet (IRP) to represent the data in the write buffer 84. The IRP is a structure created and managed by the NT I/O manager to pass commands and data to kernel mode components and drivers. The NT I/O manager 86 creates an IRP which includes data for the write command, denoted as IRP_MJ_WRITE 88, which is passed to the upper filter driver 90. The upper filter driver, as well as the lower filter driver described in the following paragraphs, may perform additional processing on each of the IRPs as they are passed between drivers. In this example, the upper filter driver 90 checks to determine whether the particular write command is for a file that has checksumming enabled. This may be indicated, for example, by different types of metadata associated with a file that may be passed down to the upper filter driver. An example of the IRP data structure is described generally in more detail elsewhere herein. However, it should be noted that the IRP may be used to pass and communicate data as needed between different drivers.

If checksumming is enabled, the upper filter driver obtains the checksum. The checksum may be obtained in any one of a variety of different ways in accordance with a particular embodiment. For example, in one embodiment, the upper filter driver may calculate the checksum on the data associated with the particular I/O request. In another embodiment, the checksum may be passed to the upper filter driver 90 as part of the data associated with the IRP 88. The checksum may be calculated prior to the upper filter driver being called. For example, software associated with the SQL server as described in connection with the application software 82 may perform the checksum on the data being transferred in the associated I/O request and embed the checksum in the data buffer. In this instance, the upper filter driver may extract the previously calculated checksum from the data passed as an input data parameter in the IRP or through other means to the upper filter driver 90.

Having the application software 82 perform the checksum calculation may have advantages. For example, since the checksum is calculated before the buffer is actually submitted to the I/O system, such as to the NT I/O manager 86, if any corruption occurs between the time that the application software submits the buffer and the time that the upper filter sees the buffer, the corruption may be detected at this particular point by examining the checksum and the data. Additionally, the application software such as SQL may validate the checksum when it later reads the buffer from the disk, such as in connection with performing a read operation.

However the upper filter driver obtains the checksum, the upper filter driver uses an IRP identifier (IRP id) to form an index and sends the IRP identifier and the associated checksum to the lower filter driver 102. The IRP identifier is a number uniquely identifying a particular IRP as one for which checksumming has been enabled. In one embodiment, the IRP id may be a memory address of the IRP data structure. The upper filter driver calls the lower filter driver to store an indication of each particular IRP that has checksumming enabled. Subsequently, particular processing may be performed when the lower filter driver is called as part of the sequence of layers of drivers as described in more detail in paragraphs that follow.

An IRP index may be formed from the IRP identifier using any one of a variety of different techniques as known to those skilled in the art. For example, in one embodiment, the IRP index may be formed using the IRP identifier and using a hashing technique, such as a mathematical modulus, or MOD, function in which a remainder may be the associated IRP identifier. The IRP address may be divided by 1,000 where the remainder may be used as the IRP identifier. Other embodiments may choose a particular range of identifiers in accordance with a number of IRPs that may be included in an embodiment. A routine may be called from the upper filter driver 90 passing the IRP identifier and the checksum for use by the lower filter driver 102. The lower filter driver 102, or other invoked routine, may store the IRP identifier and checksum in a list or other data structure used to indicate which IRPs have checksumming enabled so that the lower filter driver 102 may subsequently perform special processing, which is described in more detail in following text.

Generally, the hashing techniques that may be used herein map an IRP id, IRP address in this instance, to an index. The range of the indices may be values between 0 and some number considerably smaller than the number of possible IRP addresses. This index produced using a hashing technique, such as the MOD function described elsewhere herein, may be an index into a data structure, such as an array. The particular hashing technique may sometimes map two input values (IRP ids) to the same index resulting in a hash collision as known to those of ordinary skill in the art. Any one of a variety of different resolution techniques may be used to resolve a hash collision including, for example, an open address hashing scheme or a closed address hashing scheme. For example, in one embodiment, a linked list of collisions for each particular index may be maintained. Each array index may actually be record that includes a collision count and a pointer to a linked list of collision entries.

Following below is a pseudo-code like representation of how a hash index may be formed in one embodiment from the IRP id which is an address or pointer to the IRP structure:

```
hash_index=(IRP id/8) modulo array_size
if(array[hash_index] already in use)
then
    increment (array[hash_index].collision_count)
    allocate structure from free pool & fill in members
    add structure to linked list of colliding structures for
        hash_index
end then
else
    array[hash_index]=current index and fill in appropriate
        fields for checksum, etc.
```

It should be noted that hash collisions in an embodiment may be relatively rare so the overhead of searching the associated linked lists is minimal. If this proves not to be the case in particular embodiments, different measures may be taken, such as adjusting the size of the table, changing the hashing scheme if the distribution is not uniform, and the like.

It should also be noted that in the foregoing, the IRP ID is divided by 8 before taking the modulus. In this example, since IRP IDs are addresses, they are always 8-byte aligned. If this division by 8 was not performed, then 7 out of every 8 slots in the array would never be used. Other embodiments may include different variations of the foregoing in accordance with each particular implementation.

The upper filter driver 90 then passes the IRP, including the IRP identifier, as an IRP_MJ_WRITE 92 to the NTFS or file system layer 94. It should be noted that in this particular example, the NTFS is the particular file system being used. However, another embodiment may use a different file system layer at this point in processing for a driver.

It should be noted that each of the drivers, such as the file system driver, perform a particular portion or division of labor of the tasks in connection with performing the I/O request. In this example, the labor or operations for processing an I/O request are divided among each of the different drivers described herein. The file system driver, such as the NTFS file system driver 94 may perform, for example, writing data at a specified byte offset within a file. Subsequently, the file system driver 94 may pass the IRP as an IRP_MJ_WRITE IRP 96 to the SCSI class driver 98.

In this example, the SCSI class driver 98 may also be characterized as a disk class driver. The disk driver may perform the mapping of a logical to a physical disk address such as translating a file relative byte offset into a disk relative byte offset. Additionally, the SCSI class driver which is an instance of the disk class driver may pass an IRP_MJ_SCSI 100 which is an IRP containing a standard SCSI command to the lower filter driver 102. Within the IRP_MJ_SCSI 100 is a SCSI request block (SRB) to perform an I/O operation in accordance with the SCSI protocol in this example. Generally, an SRB may be characterized as a structure containing a standard SCSI command request. An SRB encapsulates a command data block (CDB) which is a structure that includes a standard header and command related data for a SCSI command. As will be described in paragraphs that follow, the SCSI protocol provides for a vendor to define CDBs using vendor defined or unique commands.

Part of the data that is passed to the lower filter driver 102 from the SCSI class driver 98 as part of the IRP_MJ_SCSI 100 is the IRP identifier. If the IRP identifier that is passed from the SCSI class driver 98 to the lower filter driver 102 matches one that is stored on the list of IRP identifiers accessed by the lower filter driver, then special processing may be performed by the lower filter driver in accordance with the enablement of checksumming. The lower filter driver may accordingly change the code associated with the write command to the vendor unique code in a CDB that includes an additional field in the command block for the checksum as indicated in the IRP 104 as the IRP_MJ_SCSI with the unique vendor defined code. This vendor defined code may be, for example, a function code associated with a particular portion of the CDB indicating that a write operation is to be performed. Rather than use the function code associated with a standard SCSI write operation, for example, a function code may be associated with a vendor defined or unique operation. Otherwise, if the IRP identifier does not match an entry in the list of checksum IRP identifiers, the standard SCSI write command may be used.

The IRP 104 containing the CDB with the unique command or the standard write command may then be passed to the SCSI port driver 106 for further forwarding to the data storage system. Micro code within a Symmetrix data storage system, for example, as shown in connection with FIG. 2, may validate the checksum in accordance with data of the I/O request. If an error is detected, for example, such that the checksum does not match in accordance with the data, an error code may be generated prior to the write being complete. Upon detection of validation failure, the write request may also fail and the host system may be provided with immediate feedback prior to the write being complete that the buffer or data was somehow corrupted.

Figure 6:
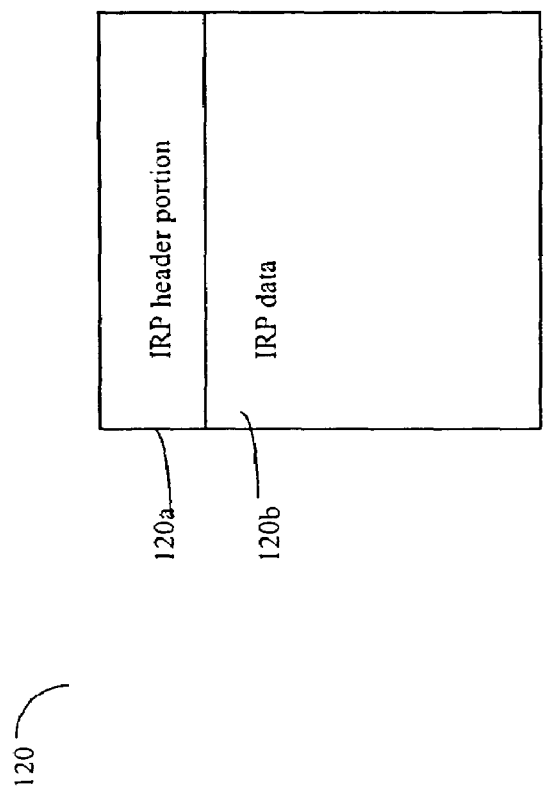
FIG. 6 is an example of an embodiment of an I/O request packet (IRP)

Referring now to FIG. 6, shown is an example of an embodiment of an IRP. Generally, an IRP 120 may include a header portion 120*a* and a data portion 120*b*. The fixed or header portion 120*a* may include information such as the type and size of the request, whether the request is synchronous or asynchronous, a pointer to a buffer for buffered I/O and other information. The IRP data portion 120*b* may include data particular for use by the driver to which it is being passed. An IRP data portion 120*b* may include, for example, a function code, function specific parameters, pointer to a file object and the like. The I/O request packet or IRP 120 is a structure that may be created by the I/O manager and used to pass commands and data to the kernel mode components and drivers.

Figure 7:
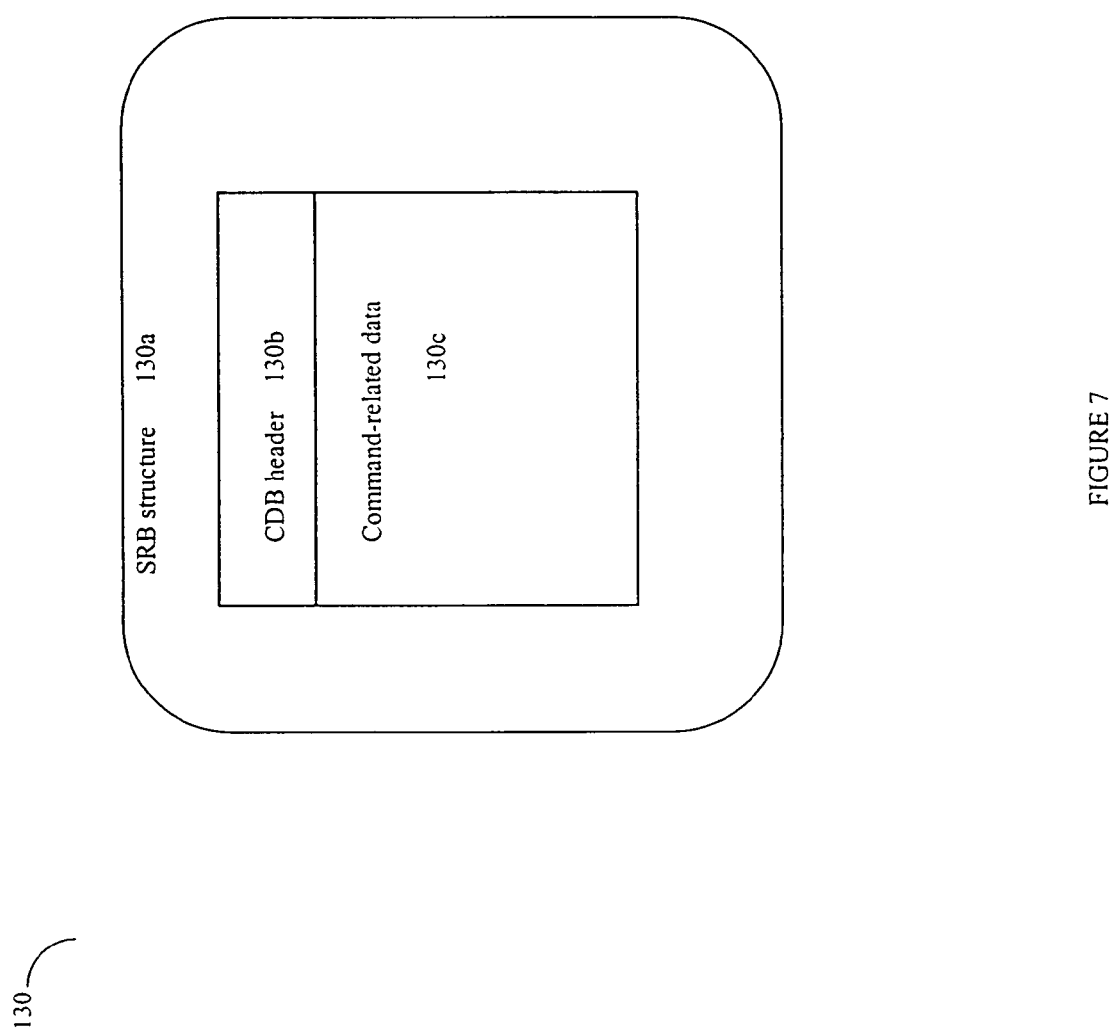
FIG. 7 is an example of an embodiment of a command data block (CDB) and its relation to the SCSI request block (SRB) as may be used in connection with issuing an I/O request in the system of FIG. 1.

Referring now to FIG. 7, shown is an example of a representation 130 illustrating a relationship between a CDB and an SRB. In this example, in accordance with the SCSI standard, a CDB may include a CDB header 130*b* and other command related data 130*c*. Generally, as described herein, a command data block or CDB may be characterized as a structure including a standard header 130*b* and command related data for a SCSI defined command 130*c*. The SCSI protocol allows vendors to also define their own CDBs for vendor unique or vendor defined commands. In this instance, the command related data, for example, may vary in accordance with a particular vendor defined command. When using a vendor defined write command as in this example when checksumming is enabled, the associated function code may be a vendor defined function code as opposed to, for example, a standard SCSI command function code.

An SRB 130*a* may be characterized as a structure containing a standard SCSI command request. The SRB may encapsulate a CDB as described herein. The SRB 130*a* may be that which is passed to particular data storage system, for example, when processing a standard SCSI command or a vendor defined unique command.

It should be noted that the micro code included in a portion of the data storage system, such as the Symmetrix data storage system may be included in, for example, a host adapter such as 21*a* or other data storage system component in performing the checksum validation processing. The techniques described herein in connection with checksum processing may be performed by any storage system having a microprocessor that may, for example, execute instructions in an implementation of the checksum techniques.

As described herein with the Windows NT operating system, a filter driver may generally be characterized as a kernel mode device driver attaching above or below another driver. The upper and lower filter drivers perform additional processing on various IRPs as they are passed between drivers. The NT I/O manager is a kernel mode component of the Windows NT operating system that manages I/O operations to and from all devices and all kernel mode drivers.

As shown in FIG. 5, the Windows NT operating system includes user mode 110*a* and a kernel mode 110*b*. Software included in the application layer 64 and user layer 62 of FIG. 4 may execute in the user mode 110*a*, for example, as shown with reference to the application 82 in user mode 110*a*. The application 82 may make I/O requests to the I/O manager and other components of the operating system and drivers that execute in kernel mode 110*b*.

Figure 8:
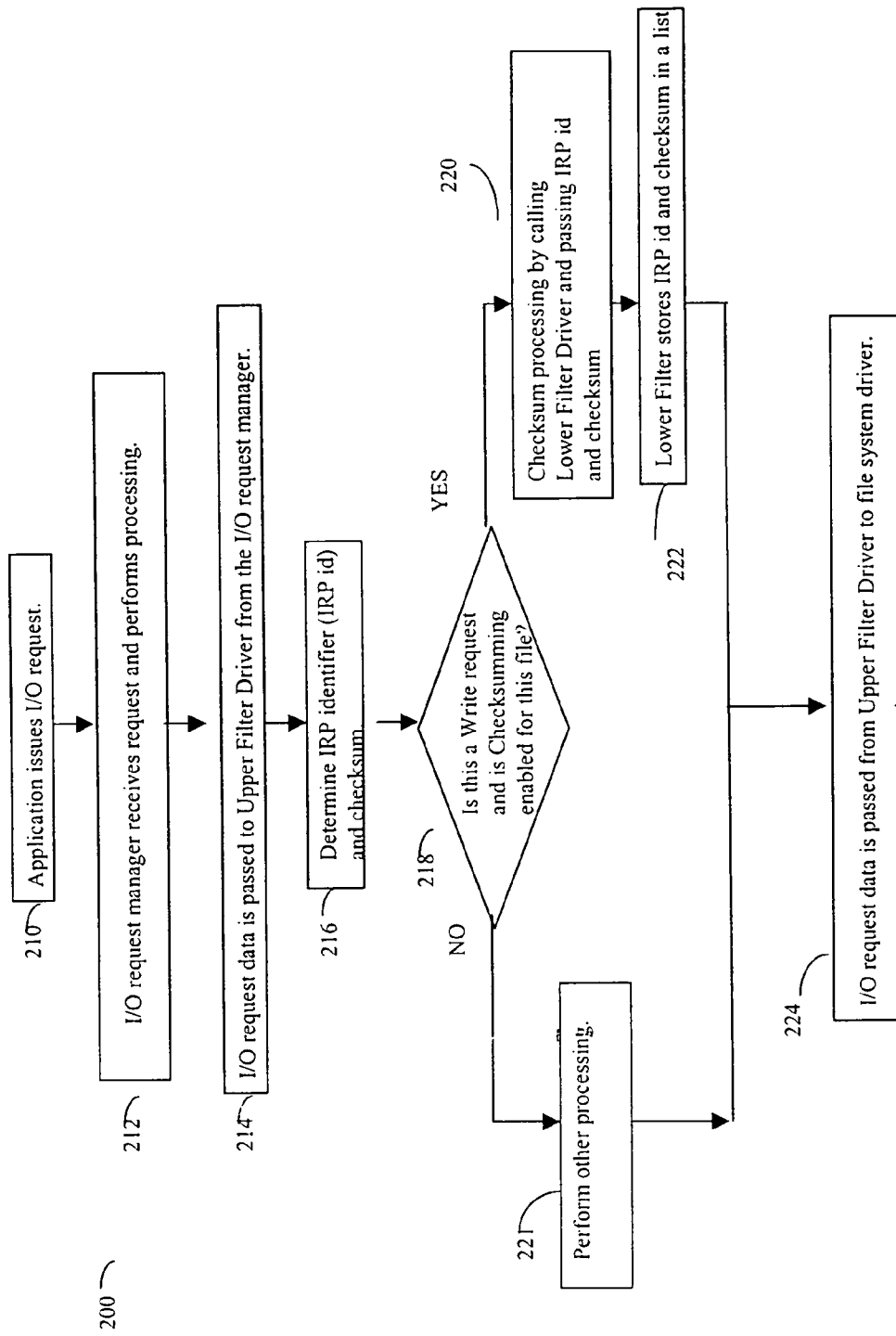
FIGS. 8–9 are steps of an embodiment in a flowchart for issuing an I/O request by a host computer system within the system of FIG. 1.
Figure 9:
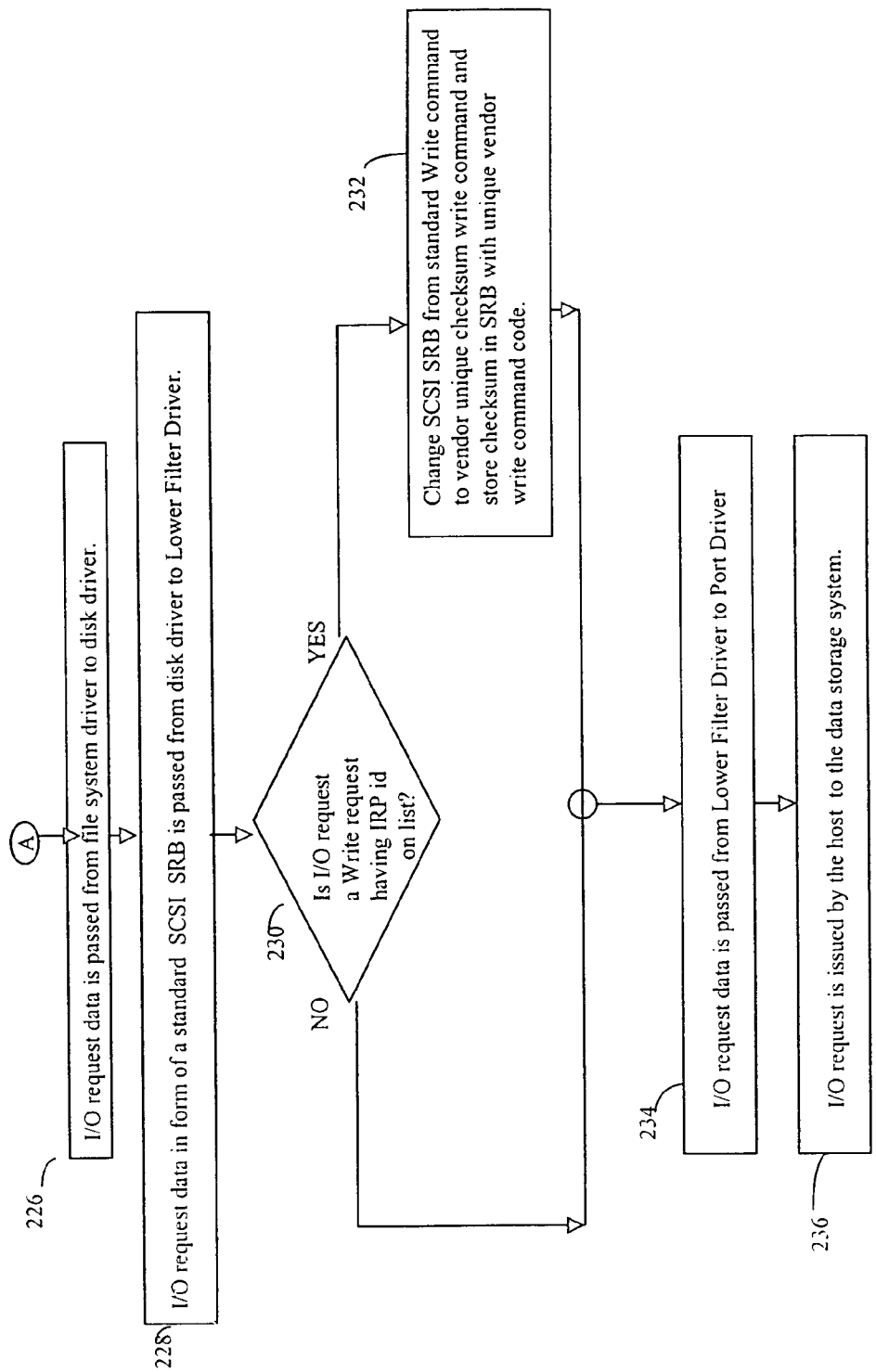

Referring now to FIGS. 8 and 9, shown are steps of an embodiment included in a flowchart that may be used in processing an I/O request. In particular, the method steps that will be described in connection with flowchart 200 of FIGS. 8 and 9 are a summary of processing steps previously described in connection with FIG. 5 and the software functionality described therein. At step 210, an application issues an I/O request. An I/O request, for example, may be initially issued by a user program to other application software such as in connection with storing files in a particular database, such as an SQL database. Subsequently, the application software such as the SQL software, may issue an I/O request at step 210 which is received by the I/O request manager executing in kernel mode at step 212. As part of the processing of step 212, the I/O request manager may perform I/O request processing including, for example, allocating storage and initializing the IRP. At step 214, the I/O request data is passed from the I/O request manager to the upper filter driver. The upper filter driver at step 216 determines the IRP identifier and checksum associated with this particular I/O request.

At step 218, it is determined if this particular I/O request is a write request and if checksumming is enabled for this particular file associated with the write request. If so, control proceeds to step 220 where checksum processing may be performed by calling the lower filter driver passing the IRP identifier and the checksum. At step 222, the lower filter driver stores the IRP identifier in a list. As described elsewhere herein, in one embodiment, this list may be an array in which the IRP identifier is hashed to yield an array index where the IRP identifier and checksum are stored. It should be noted that an embodiment may perform the processing associated with steps 220 and 222 for example, using any one of a variety of different techniques. In one embodiment, the upper level filter driver may pass information to the lower filter driver using a call back technique where the upper level filter driver calls a particular function that returns data in the form of parameters to the low level filter driver.

The particular call back technique that may be included for use in one embodiment will now be described in more detail. Upon initialization, the upper filter driver may communicate with the lower filter driver by sending a first custom I/O control (IOCTL) call. Included in this first call is a buffer, provided by the upper filter driver, where the lower filter driver may store the address of a call back routine in the lower filter driver. When the upper filter driver subsequently needs to notify the lower filter driver of the IRP address and checksum information, the upper filter driver does so by calling the lower filter's call back routine. An embodiment may use such a call back technique for speed and efficiency.

The checksum may also be determined using any one of a variety of different techniques. The upper filter driver itself may determine the checksum or, alternatively, the upper filter driver may be passed the checksum value previously calculated by another routine. This is described in more detail also herein. It should be noted that upon a determination that this particular I/O request is not a write request or that checksumming is not enabled, control may proceed to step 221 where other processing may be performed.

Control proceeds to step 224 where the I/O request data in the form of an IRP may be passed from the upper filter to the file system driver where the file system driver performs processing. Control proceeds to step 226 where the I/O request data may be passed from the files system driver to the disk driver. At step 228, the I/O request data may be passed to the lower filter driver in the form of a standard SCSI SRB. At step 230, the lower filter driver performs processing by making a determination as to whether the I/O request is a write request having an IRP identifier stored in the checksum list. If so, control proceeds to step 232 where the SCSI SRB is modified from a standard SCSI write command to a SCSI command for a vendor unique checksum write command. In this example, the modifications may include storing the checksum within the SRB and modifying a command or function code within the SRB to be that associated with the vendor unique command rather than the standard SCSI write command.

Control proceeds to step 234 where the I/O request data is passed from the lower filter driver to the port driver and, subsequently, the I/O request at step 236 is issued by the host to the data storage system.

Figure 10:
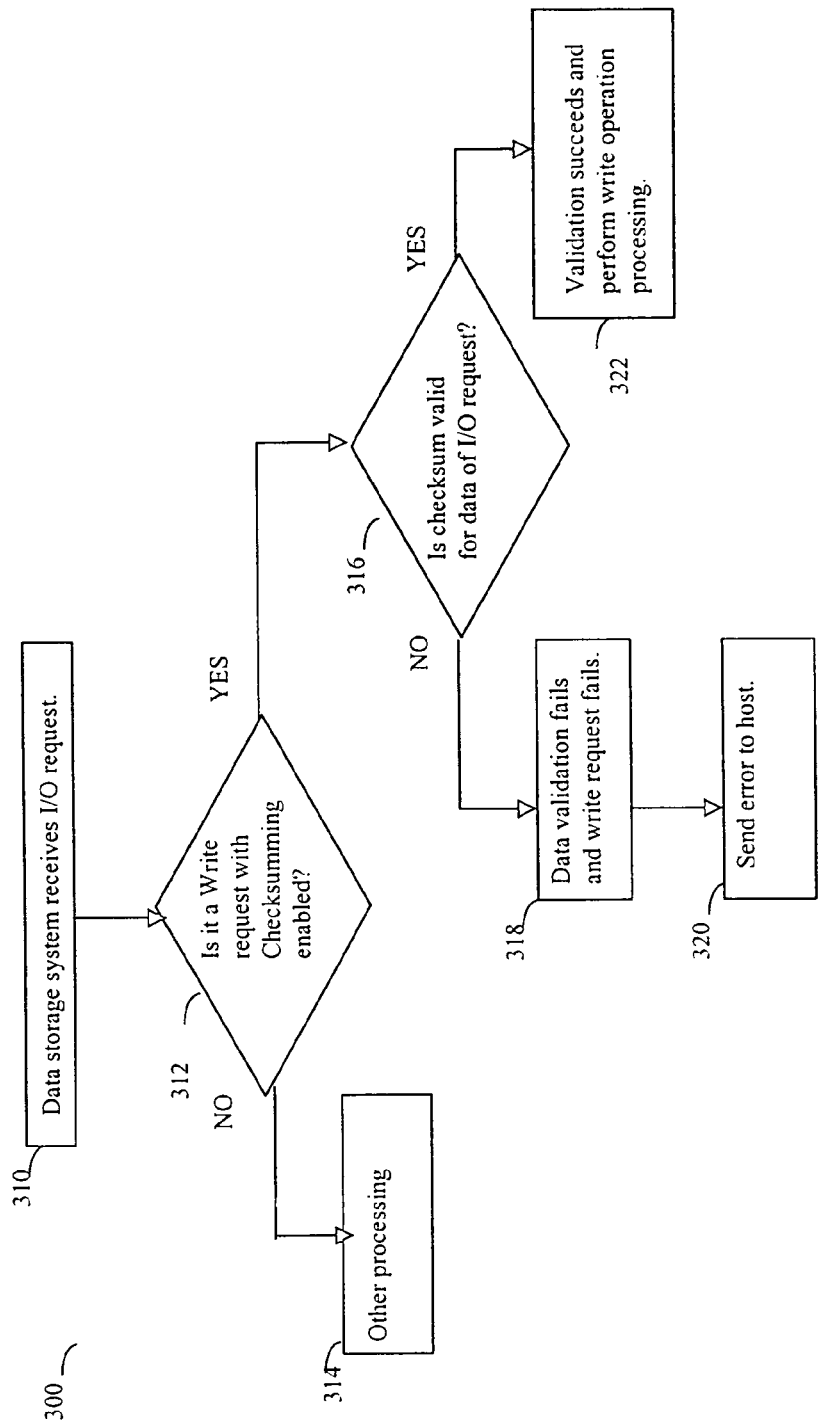
FIG. 10 are steps of an embodiment in a flowchart for processing an I/O request received by a data storage system within the system of FIG. 1.

Referring now to FIG. 10, shown are processing steps of a flowchart 300 that may be performed by a data storage system upon receiving an I/O request. At step 310, the data storage system receives the I/O request and performs processing to classify the I/O request. At step 312, a determination is made as to whether the I/O request is a write request with checksumming enabled. If not, control proceeds to step 314 where other processing may be performed in accordance with the particular type of I/O request. Otherwise, control proceeds to step 316 where a determination is made if the checksum is valid for data associated with the I/O request. If so, control proceeds to step 322 where an indication is made that the validation has succeeded and subsequently the write operation processing steps may be performed. Otherwise, at step 316 if a determination is made that the checksum is not valid in accordance with a particular data of the I/O request, control proceeds to step 318 where an indication is made that the data validation has failed and the write request has also failed. It should be noted that an embodiment may choose to not perform the actual writing of the data out to the device. Alternatively, an embodiment may perform the writing of the corrupt data and indicate that a checksum error has occurred. At step 320, an error is sent to the host in accordance with step 318 processing. For example, the host may be sent a message indicating that the write request has failed in accordance with the checksum data validation failure.

In one embodiment, the SCSI protocol allows for the target, such as a Symmetrix storage system, of a SCSI command to return a status code indicating the success or failure of an action. A unique status code associated with the unique vendor-defined SCSI command may be used indicating that a write operation has failed due to a checksum validation failure. The lower filter driver may convert the received status code into a special code provided by the operating system and the special code is further passed back up the call chain to the invoking application.

The host application, upon seeing that the write operation has failed the checksum test may perform any one of a variety of different actions. For example, the host may retry the write operation or choose to halt the write operation until the source of the problem has been identified and/or corrected. In either instance, using processing just described, the host has been notified of a data corruption upon its occurrence rather than, for example, upon a subsequent read operation performed sometime later following the write operation of the corrupted data.

The foregoing description sets forth processing steps and figures in connection with forming a single checksum for a single data buffer. In some embodiments, a write buffer associated with a write I/O request may be fragmented by a file system, such as the NTFS file system 94 as described in connection with FIG. 5. A single write buffer 88 may be used as input to the upper filter driver. However the file system 94 may apportion the original write buffer into a plurality of smaller data buffers each associated with an IRP. Collectively, all the newly produced IRPs associated with the smaller data buffers may represent the original data buffer associated with the write I/O request.

The file system may fragment a data buffer depending on where different portions of the data included in the original write buffer may be physically located on one or more devices. For example, initially a file may be created a certain size. As data is added to the file, the file may increase in size. The file system stores these additional portions associated with the same file at various locations that may be physically at different locations within the same device or on different physical devices. When this occurs, a write operation associated with a single logical file may result in actually writing different portions of the data buffer to different physical locations on one or more different devices. In connection with this processing, the file system 94 may divide a data buffer up into one or more smaller buffers corresponding to the different physical locations associated with a particular logical file.

If fragmentation is performed by the file system such as the NTFS file system 94, a plurality of smaller buffers may be output from the file system. In order to properly perform the checksumming if fragmentation has occurred, the upper filter driver may perform different processing than as described previously herein.

Figure 11:
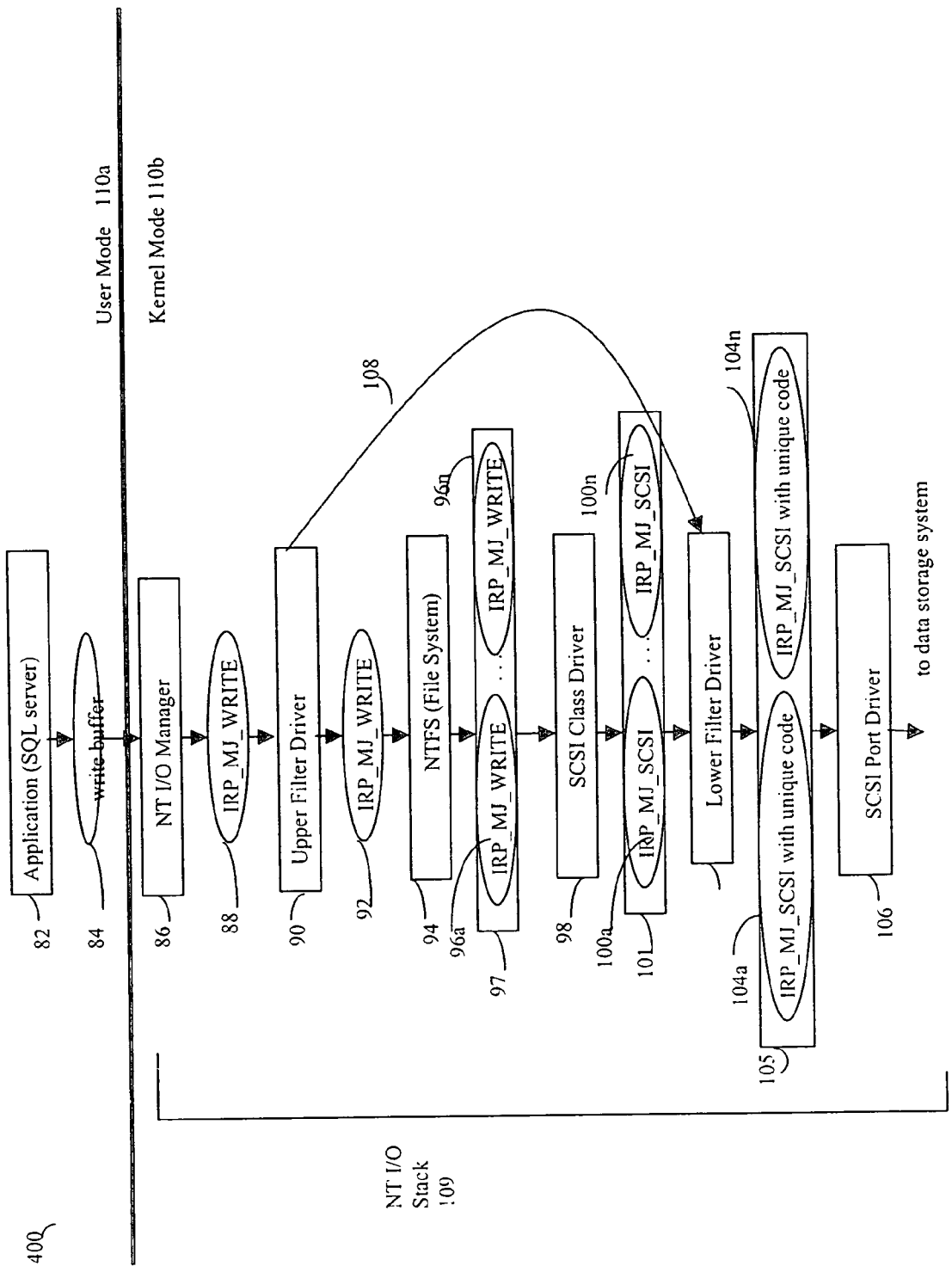
FIG. 11 is a detailed diagram illustrating processing steps through different driver layers in connection with an I/O request.

Referring now to FIG. 11, shown is a detailed diagram illustrating processing steps through different layers of software when making an I/O request in a system which includes fragmentation. Many of the elements included in FIG. 11 are similar to those as numbered and previously described in connection with FIG. 5. However, note that one of the differences occurs as an output of the file system 94 where a plurality of IRPs 97 may be produced, which are denoted 96a–96n. Similarly, a plurality of corresponding IRPs 101, denoted 100a–110n, are output by the SCSI class driver. Additionally, as an output of the lower filter driver, shown are a plurality of IRPs 105, denoted 104a–104n, each including the unique vendor defined function code, for example, in connection with a write operation when checksumming is enabled as previously described herein. Thus, the difference between the illustration of FIG. 11 and FIG.

5 is that the single input write buffer 84 has been fragmented into a plurality of smaller data buffers denoted at different points in the layering process such as at 97, 101 and 105.

Figure 12:
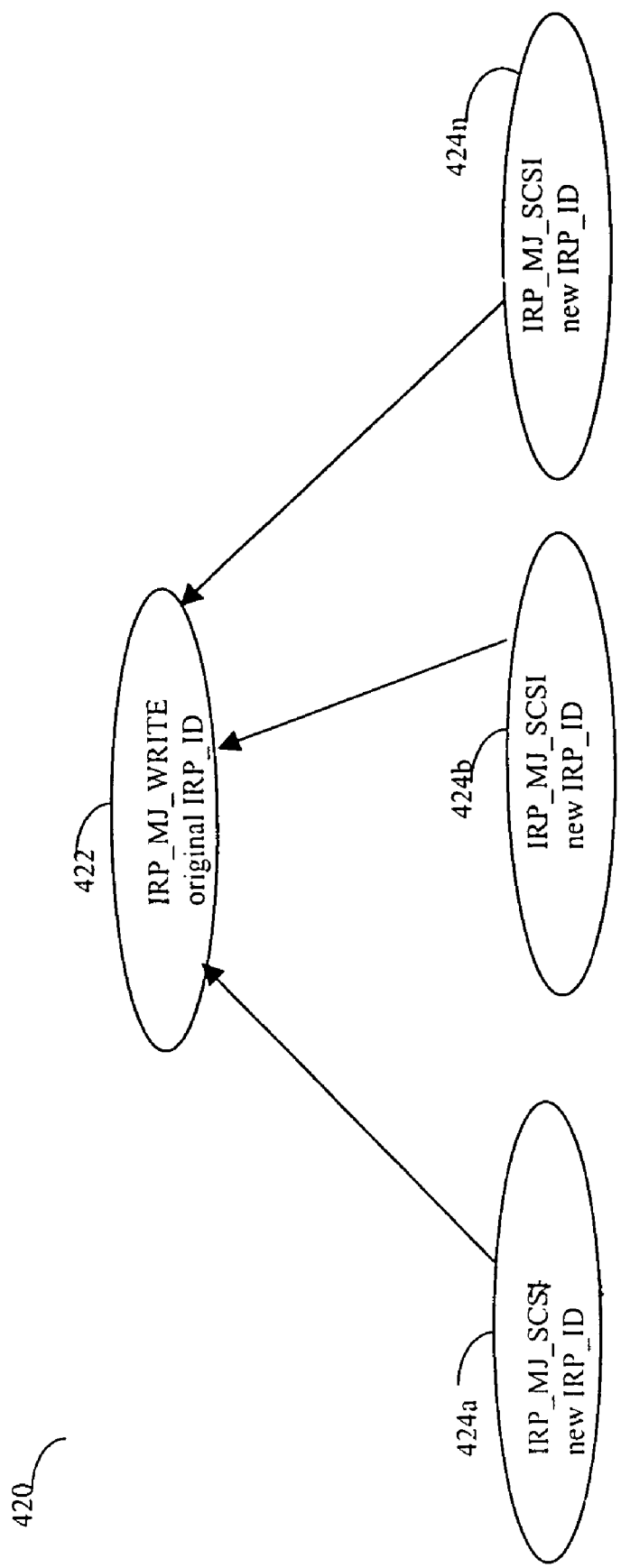
FIG. 12 is an example of a representation of the relationship between smaller fragmented buffers and an original write buffer.

Referring now to FIG. 12, shown is an example of a representation of the relationship between smaller fragmented buffers and an original write buffer. Shown in FIG. 12 is a relationship 420 between different IRPs that include the SCSI commands and associated fragment data buffer, and the original writebuffer. Each of the smaller fragmented buffers denoted 424a–424n includes a pointer or identifier denoting the original write data buffer.

The IRP id associated with the original right data buffer 422 may be referred to also as a parent IRP id. Each of the smaller fragmented data buffers 424a–424n may each include their own IRP id and may also be referred to as child IRP ids denoting the relationship between each of the smaller fragmented buffers and the original write data buffer 422.

In an embodiment in which fragmentation of a data buffer is possible, the processing performed by the upper filter driver in connection with forming a checksum, such as in connection with processing at step 216 of FIG. 8, may include determining a plurality of checksums in accordance with the original write data buffer. In one embodiment, the data buffer may be divided into a plurality of smaller portions and a checksum may be determined for each of the portions. The upper filter may divide the entire data buffer into a plurality of pieces in which each piece is the smallest size possible or accessible in accordance with the minimum buffer size limits of the system. For example, a buffer that is 100 K bytes in length may be divided into 10 pieces such that each piece represents a 10 Kbyte chunk. The 10 K byte chunk may be the smallest or minimum size which may be output by the file system, for example, in connection with fragmentation. The upper filter driver may then perform a checksum on the data included in each of the small pieces. The upper filter driver may then pass the IRP id and each of the plurality of checksums associated with the different small pieces to the lower filter driver.

Additionally, the upper filter driver may either pass a byte range mapping to the lower filter identifying which checksum corresponds to what particular bytes of data of the original data buffer. Alternatively, the upper and lower filter driver may have an understanding rather than pass a byte range mapping, for example, as a parameter, such that the lower filter driver knows that a checksum corresponds to a particular byte range.

Figure 13:
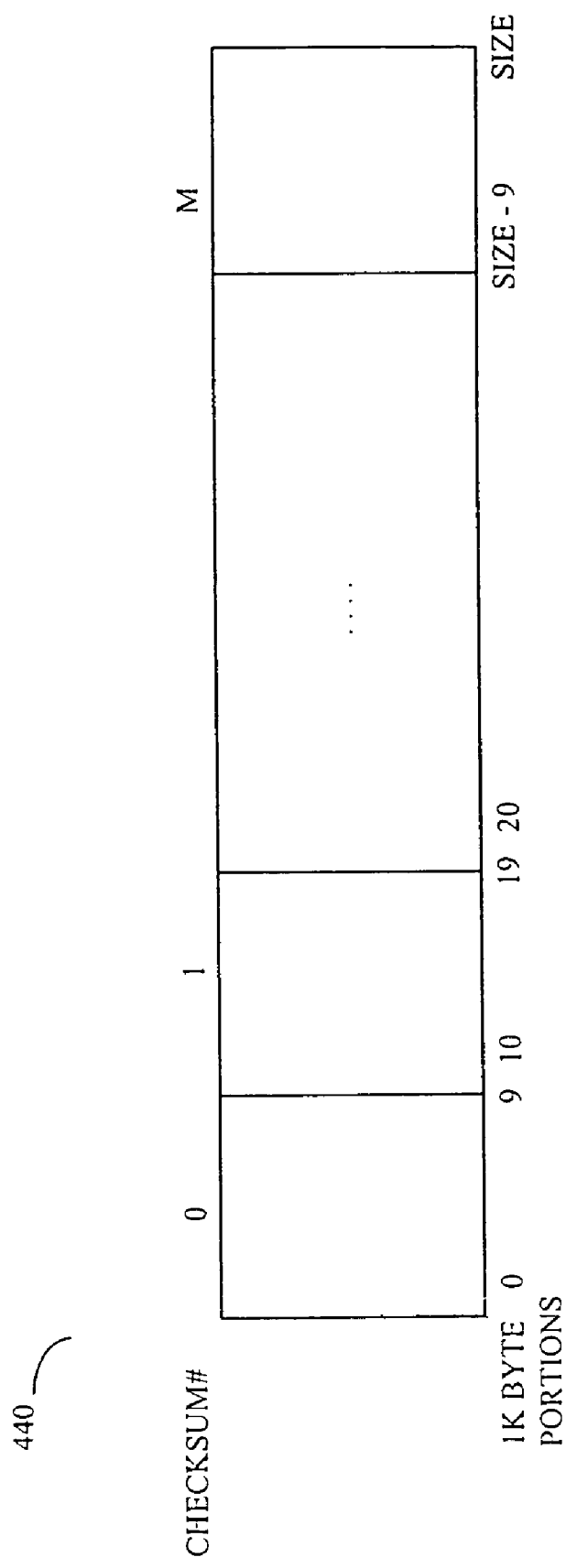
FIG. 13 is an example of a mapping of a data buffer bytes to checksum values.

Referring now to FIG. 13, shown is a representation 440 of how particular bytes of a data buffer may correspond to a checksum in referring to the 100 K byte example just described. A data buffer has an associated plurality of checksums denoted 0 through M corresponding to 10K byte portions. The data buffer consists of a SIZE number of 1K byte portions. The information included in the representation 440 may also be referred to as a checksum byte range mapping of the original write data buffer. The information included in the representation 440 may be passed, for example, from the upper filter to the lower filter as a parameter or through other mechanisms known to those skilled in the art. Alternatively, as also described herein, the information of the representation 440 may be understood by both the upper and lower filter such that there is only one representation possible of mapping data buffer bytes to a particular checksum, for example, in accordance with multiples of the smallest possible fragment allowable within the system. This checksum byte range mapping may be used by the lower filter driver in determining the checksums for a particular data portion of the data buffer. It should be noted that an embodiment may have different fragment sizes, for example, such as determining a checksum for each 4K block or portion rather than each 10K portion.

Referring back to FIG. 11, it should be noted that each of the smaller fragments or pieces corresponding to a portion of the original data buffer may be output one at a time, for example, as passed between the different layers of the NT I/O stack 109. In other words, it is not that a single output 97 is produced simultaneously from the NTFS file system that includes all of the smaller buffers. Rather, an embodiment may include a file system that, subsequent to fragmenting a write data buffer, may output each of the different child IRPs one at a time passing it to the lower driver layers. The lower filter driver 102 may receive each of the fragmented IRPs one at a time rather than in a batched form. In this instance, the lower filter driver 102 may perform some bookkeeping to keep track of what fragments of an original write data buffer have passed to the lower filter driver.

Figure 14:
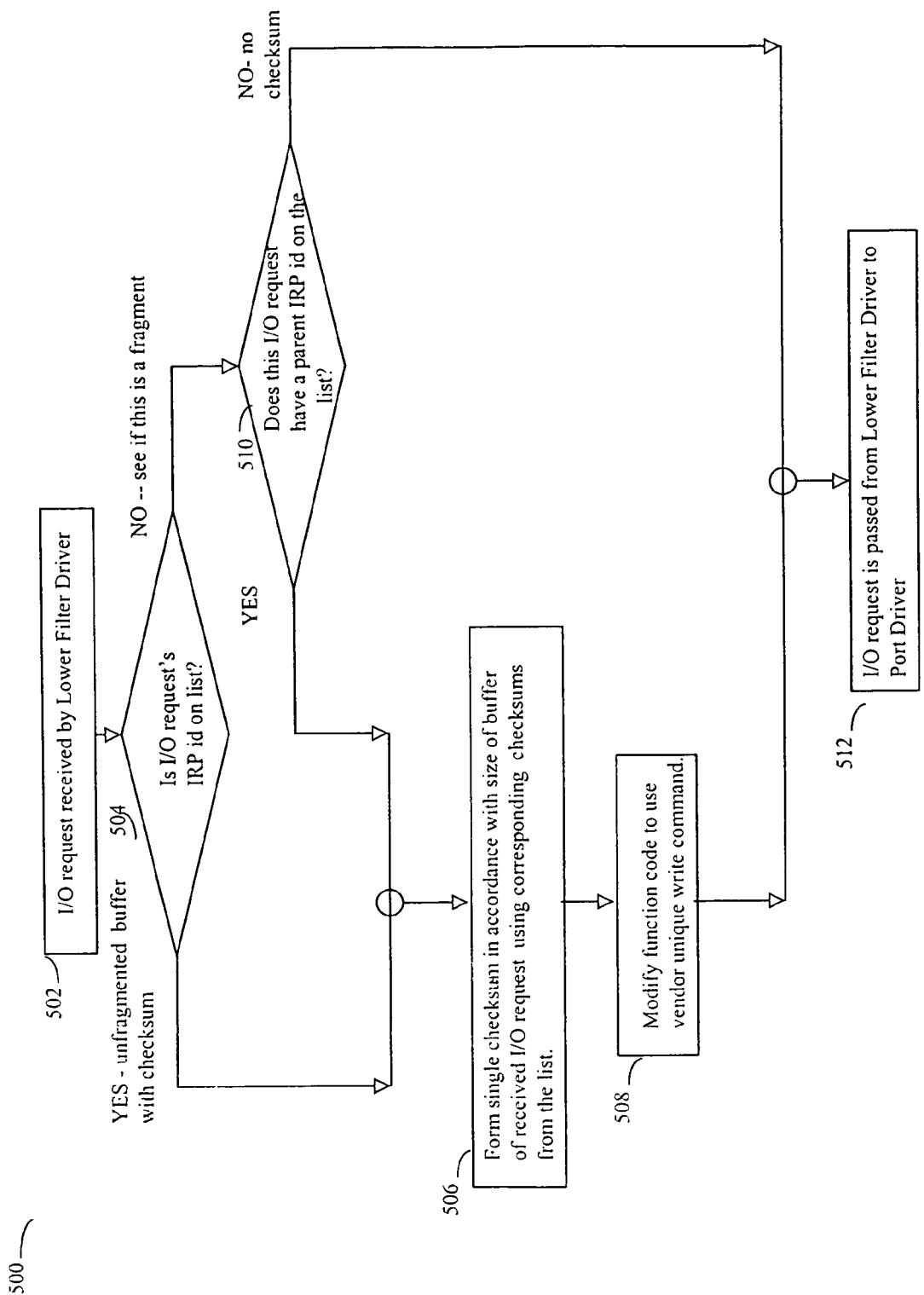
FIG. 14 is a flowchart of processing steps that may be performed by the lower filter driver in an embodiment that may include fragmentation of the original I/O data buffer.

Referring now to FIG. 14, shown is a flowchart 500 of processing steps that may be performed by the lower filter driver in an embodiment that may include fragmentation. It should be noted that the processing steps of flowchart 500 of FIG. 14 may be performed in place of other processing steps previously described in connection with FIG. 9 as may be performed by the lower filter driver.

At step 502, the I/O request may be received by the lower filter driver. At step 504, a determination is made as to whether the I/O request which has been received includes an IRP id which is on the list of those IRPs enabled for checksumming in accordance with information previously passed from the upper filter driver. If a determination is made at step 504 that the I/O request's IRP id is on the list indicating that checksumming has been enabled, control proceeds from step 504 to step 506 indicating that the I/O request is an unfragmented original buffer and associated request. At step 506, a single checksum is formed using corresponding checksums stored on the list of partial checksums passed from the upper filter driver. The single checksum formed is in accordance with the size of the entire buffer, since this is the size of the received I/O request's buffer. The single checksum may be performed, for example, by performing a logical exclusive-OR (XOR) operation of different checksums corresponding to the different portions of the buffer, for example, as described previously in connection with FIG. 13. At step 508, the function code may be modified to use the vendor unique defined write command with a checksum. Control then proceeds to step 512 where the I/O request is passed from the lower filter driver to the port driver.

At step 504, if a determination is made that the I/O request's IRP id is not on the list, control proceeds to step 510 where a determination is made as to whether the I/O request has a parent IRP id which is on the list. If a determination is made at step 510 that the I/O request has a parent IRP id which is on the list, control proceeds to step 506. Otherwise, control proceeds from step 510 directly to step 512 because it has been determined that checksumming has not been enabled for either an unfragmented buffer, or a fragmented portion of an original write data buffer.

If it has been determined that either an unfragmented buffer has been received, or that the I/O request received corresponds to a fragment or portion of an original data buffer, a single checksum is formed corresponding to the size of the data buffer of the received I/O request using the plurality of checksums previously received from the upper filter driver. The single checksum may be formed, for example, by performing a logical exclusive OR operation of the different checksums corresponding to smaller pieces of the data buffer.

Figure 15:
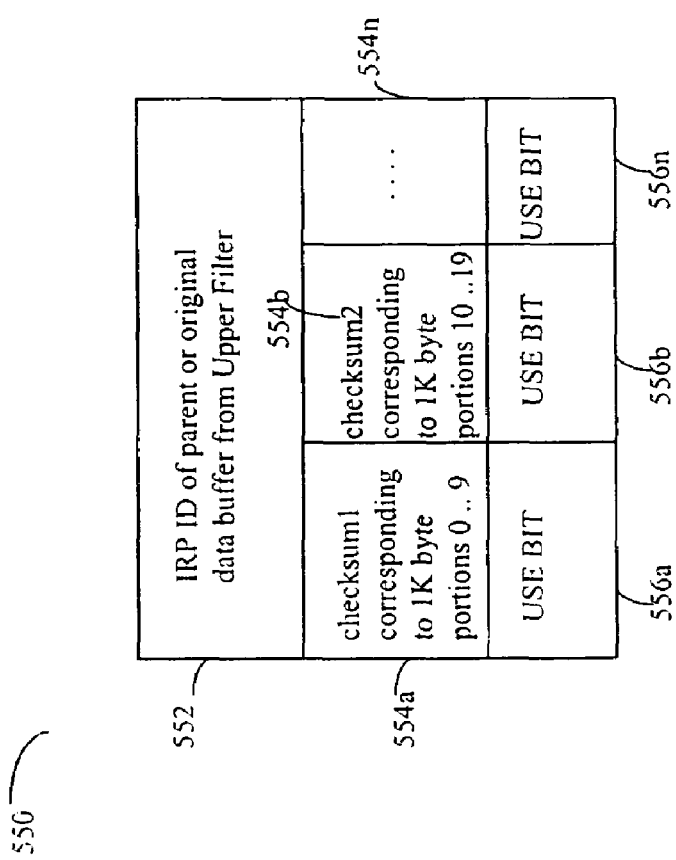
FIG. 15 is an example of an embodiment of a record created for each set of information passed from the upper filter to the lower filter driver.

Referring now to FIG. 15, shown is an example of an embodiment of a record that may be created for each set of information passed from the upper filter to the lower filter driver upon the upper filter driver determining that checksumming has been enabled for a data buffer. As previously described in connection with an embodiment that may include fragmentation of an original data buffer, the upper filter driver may pass to the lower filter driver in the IRP id of the parent or the original data buffer as well as a plurality of checksums corresponding to different portions of the original data buffer.

As described herein, the original data buffer may be divided up into smaller chunks or portions corresponding to the smallest possible piece or fragment allowable in a system. In this example, the smallest piece or portion is a 10K byte portion. Accordingly, the upper filter driver has determined and communicated to the lower filter driver a checksum for each 10K portion of the original data buffer. For example, if the original data buffer is 100K bytes, 10 checksums along with the IRP id of the parent or original data buffer are communicated to the lower filter driver and may be stored in a record or other data structure similar to that as shown as element 550. The lower filter driver or other body of machine executable code may build and maintain a linked list, an array, or other type of data structure that includes multiple instances of the record 550 when information is communicated from the upper to the lower filter driver.

Subsequently, the lower filter driver may use this data structure created that includes one or more instances of the record 550. Additional bookkeeping may be performed in an embodiment by the lower filter driver when processing a fragmented data buffer. A single original write data buffer may be divided into a plurality of fragments by the file system. As each of these fragments mapping to one or more pieces of the original data buffer pass through the lower filter driver, the lower filter driver may perform bookkeeping keeping track of what portions of the original data buffer have passed through. Referring back to our example of a 100K byte buffer, a fragment may be received by the lower filter driver which is 40K bytes in size. These 40K bytes may correspond to the first 40K bytes of the original data buffer. Upon detecting by the lower filter that this fragment has passed through, the lower filter driver may wish to indicate, for example, via a USE BIT what 10K portions have been processed. Subsequently, when the lower filter driver determines that all portions or fragments of an original data buffer have passed through the lower filter driver, the lower filter driver may deallocate and remove from the list the associated record such as instance 550. The USE BIT fields 556a–556n may correspond to different portions of the original data buffer as represented by a single checksum value. It should be noted that other embodiments may use other mechanisms in performing this bookkeeping functionality.

It should be noted that this checksumming techniques may be used in connection with a buffer being written to a device. The data in the buffer is checksummed at the top of the I/O stack as described herein and validated by the data storage device before completing the write operation. If data validation fails, the write request also fails providing a host computer system with immediate feedback that the buffer was corrupted. This may be particularly useful, for example, when using unbuffered I/O operations as described elsewhere herein in which no caching of the data is performed by the file system. Using unbuffered I/O operations may increase the chance that the data buffer may be overwritten or corrupted since the application and drivers access the same buffer.

An embodiment using the Windows NT operating system and the NTFS file system described herein may need to include particular settings and conditions. The file associated with the checksum write operation should be aligned on a 4k boundary. Additionally, the NTFS file system should be formatted with cluster size of 4k or 1024 byte multiples. As described elsewhere herein, the file should be opened with the file system caching disabled, or using unbuffered I/O. The size of each write buffer should be an exact multiple of 4k bytes and checksumming is to be enabled for the file.

It should be noted that checksumming may be enabled for a file using a variety of different techniques that may vary in accordance with each embodiment. In this particular embodiment with the NTFS operating system, this may be done, for example, through a registry setting or using an application that may pass file names to the upper filter indicating that particular files have checksumming enabled. An embodiment may also query an application for an indication as to which files have checksumming enabled. As also described herein, the checksum may be calculated by the upper filter level or may be alternatively calculated by another application and passed to the upper filter driver, for example, as a field a data buffer or utilizing other techniques known to those of ordinary skill in the art. The details of the location in the buffer of the particular checksum can either be put in the registry or sent by a small control application communicating this information to the upper filter driver.

As described herein, the upper filter intercepts each write buffer as it is submitted to the file system and identifies the target file for the buffer. If the file is not one that is being checksummed, the buffer is passed on through to the file driver. If the file is being checksummed, the checksum is either calculated or the application has embedded the checksum in the buffer and the checksum is now extracted. The upper filter then sends the IRP identifier along with the checksum to the lower filter as also described herein.

The lower filter may be characterized as one that intercepts the SCSI IRP and identifies which ones of the IRPs have checksumming enabled in accordance with information previously passed from the upper filter driver. When the lower filter identifies an IRP as one that requires checksum processing, it replaces SCSI write command with a unique, vendor defined write-and-validate SCSI command. The checksum may be embedded in the reserved byte of the CDB as this is acceptable for the vendor unique or vendor defined SCSI commands.

In this embodiment the data storage system may include one or more Symmetrix data storage systems that include micro code for receiving particular vendor defined SCSI write-and-validate commands. If the check and validation succeeds, then the write operation is performed. If the validation fails, an error is returned to the host and is in turn propagated back up the I/O stack. In other words, such an error is propagated back up through the different drivers associated with the NT I/O stack 109 included in illustration 80 of FIG. 5.

It should be noted that the data structures utilized by the lower filter driver in storing the IRP identifier and associated checksum may be any one of a variety of different data structures. In one embodiment, an array having a bounded index may be used in which each cell of the array includes a checksum. The index into the array may be the IRP index formed from the IRP identifier in which the array may include a number of elements in accordance with the range of IRP indices possible.

The different drivers, such as the upper level filter driver, may operate on a list of files in which each file has a particular file handle. A file handle may be a unique number assigned by the operating system. This file handle may be used, for example, when performing different operations in connection with the file.

It should be noted that with a particular embodiment, a problem may be encountered with registering file names and associated attributes, such as whether a file has checksumming enabled, when the files are stored utilizing a particular database or software application organization such as SQL or Exchange. The techniques that may be used to indicate whether a particular file has checksumming enabled may vary with the file and alternative functionalities included in each embodiment.

The foregoing provides a flexible and efficient technique for early detection of data corruption in connection with the write operation. In particular, this may be used in connection with performing a write operation to storage devices, such as the Symmetrix data storage system, which may be accessed by a plurality of different computer systems and users. Early detection of data corruption using the foregoing techniques may minimize additional subsequent data corruptions and minimize costs associated with error recovery. A particular host application may be notified of a data corruption as soon as it occurs prior to actually writing the data to a device. At this point, the particular host application may perform different types of error processing in accordance with a particular application.

It should also be noted that the techniques described herein may be used in connection with any one or more of a variety of different systems having different hardware and/or software in different data storage systems. A checksum is formed near or at the top of the I/O stack. A filter driver lower in the stack is notified that this particular buffer and associated write command has checksumming enabled such that the lower filter driver changes the SCSI command to the vendor-defined write command with the checksumming, and then adds the checksum to the command data block (CDB).

While the invention has been disclosed in connection with preferred embodiments shown and described in detail, their modifications and improvements thereon will become readily apparent to those skilled in the art. Accordingly, the spirit and scope of the present invention should be limited only by the following claims.

What is claimed is:

1. A method for detecting a data error associated with a data operation comprising:
   issuing, by an application, a request for a data operation in connection with a device;
   determining if said data operation is a write operation having checksumming enabled for a file associated with said write operation; and
   forming a data packet that includes a checksum and an associated data command if said data operation is a write operation having checksumming enabled, said data packet being formed by communicating said request through a calling chain, said calling chain including calls made using drivers and a file system, said drivers including a first driver and a second driver, a first call being made from said first driver to communicate said checksum for use by said second driver, a second call, different from said first call, being made to said second driver after said file system has been invoked in said calling chain, said second call using said checksum from said first call to include said checksum in said data packet;
   receiving said data packet at a target location;
   performing, at said target location, a checksum data validation using said checksum and data included in said data packet prior to performing said write operation; and
   upon determining an error in said checksum data validation, notifying an issuing host.

2. The method of claim 1, further comprising:
   performing said write operation of said data included in said data packet when there is a checksum data validation error.

3. The method of claim 1, further comprising:
   upon determining an error in said checksum validation, returning an error to said issuing host without performing a write operation of said data included in said packet.

4. The method of claim 3, further comprising:
   issuing another write operation of said data upon said error being received by said issuing host.

5. The method of claim 1, wherein said first and second drivers are filter drivers, and the method further includes:
   using said first filter driver to obtain said checksum.

6. The method of claim 5, further comprising:
   calculating said checksum by said first filter driver.

7. The method of claim 5, wherein said first filter driver obtains said checksum from another routine not included in said first filter driver.

8. The method of claim 5, further comprising:
   associating a packet identifier with said data packet;
   passing, by said first filter driver, said packet identifier and checksum for use by said second filter driver; and
   storing said checksum.

9. The method of claim 8, further comprising:
   determining, by said second filter driver, if said data operation is a write request with checksumming enabled having a packet identifier matching one previously passed by said first filter; and
   modifying said data packet associated with said data operation to specify a vendor-defined write request rather than a standard write request.

10. The method of claim 5, further comprising:
    returning an error to said issuing application, said error being sent to said issuing application on a return path through said plurality of drivers.

11. The method of claim 10, wherein said issuing application executes in user mode and the method further includes:
    passing said data operation as a request to a data request manager that executes in kernel mode.

12. The method of claim 10, wherein said plurality of drivers execute in kernel mode.

13. The method of claim 9, wherein said standard write request is in accordance with a predefined standard.

14. The method of claim 13, wherein said issuing host is executing in a windows-based operating system and said predefined standard is a small computer system interface standard.

15. The method of claim 1, further comprising:
    forming said checksum from one or more checksum values corresponding to data included in said data packet.

16. The method of claim 15, wherein said data corresponds to all data of an original data buffer associated with said data operation.

17. A method for detecting a data error associated with a data operation comprising:
    issuing, by an application, a request for a data operation in connection with a device;
    determining if said data operation is a write operation having checksumming enabled for a file associated with said write operation;
    forming a data packet that includes a checksum and an associated data command if said data operation is a write operation having checksumming enabled;
    receiving said data packet at a target location;
    performing, at said target location, a checksum data validation using said checksum and data included in said data packet prior to performing said write operation;
    upon determining an error in said checksum data validation, notifying an issuing host; and
    forming said checksum from one or more checksum values corresponding to data included in said data packet, wherein said forming said checksum is performed by a lower filter driver, said data included in said data packet corresponds to a fragment of said original data buffer associated with said data operation, and the method further comprising:
    forming a plurality of fragments of said original data buffer by a file system, said fragment being one of said plurality of fragments, each of said plurality of fragments having a fragment identifier.

18. The method of claim 17, further comprising:
    determining, by an upper filter driver, said one or more checksum values, each of said one or more checksum values corresponding to a portion of an original data buffer received by said upper filter driver; and
    determining, by said upper filter driver if checksumming is enabled for said write operation associated with said original data buffer.

19. The method of claim 18, further comprising:
    communicating to said lower filter driver an identifier and said one or more checksum values associated with said original data buffer if checksumming is enabled for said original data buffer;
    receiving by said lower filter driver said data packet for performing a write operation using said fragment having a first fragment identifier; and
    determining, by said lower filter driver using said fragment identifier and said identifier, whether checksumming is enabled for said fragment.

20. The method of claim 19, wherein, upon determining that checksumming is enabled for said fragment by said lower filter driver, the method further comprising:
    determining which of said one or more checksum values correspond to data included in said fragment from said original data buffer;
    modifying said data packet to specify a vendor-defined write request rather than a standard write request; and
    forming said checksum by performing a logical exclusive-OR operation of said one or more checksum values corresponding to said fragment.

21. A computer system comprising:
    a host computer comprising:
        an upper filter driver that includes machine executable code for:
            determining if a received write request has checksumming enabled;
            determining one or more checksum values corresponding to data of said write request; and
            communicating to a lower filter driver said one or more checksum values and an identifier associated with said data if checksumming is enabled;
        a file system processing said write request and dividing said data into one or more portions each having a corresponding fragment I/O request and a corresponding fragment identifier;
        a lower filter driver comprising machine executable code for:
            receiving a first fragment I/O request;
            determining, using said fragment identifier and said identifier from said upper filter driver, whether checksumming is enabled for said first fragment I/O request;
            upon determining that checksumming is enabled, determining a checksum corresponding to a data portion of said first fragment I/O request, and forming a data packet that includes a special checksum function code and said checksum; and
        a data storage location comprising machine executable code for:
            performing a checksum data validation using said checksum and data included in said data packet prior to performing a write operation.

22. A method for detecting a data error associated with a data operation comprising:
    issuing a request for a data operation in connection with a target location;
    determining if said data operation is associated with an output area of said target location having checksumming enabled;
    obtaining a checksum value at a first point in an upper portion of a calling chain of drivers if said checksumming is enabled;
    notifying a lower filter driver at a point below said first point that checksumming is enabled for said data operation and said associated output area, said notifying including performing a first call included in said calling chain to communicate said checksum value for use by said lower filter driver at a second later point in the calling chain; and
    forming a command data block in connection with said data operation, said forming including a second call in said calling chain to said lower filter driver, said second call being different than said first call, and as part of processing of said second call, said lower filter driver including in said command data block a vendor-unique command in accordance with a first protocol and including a checksum value from said first call in accordance with data associated with said data operation.

23. The method of claim 22 wherein said target location is a data storage system.

24. The method of claim 22 wherein said data operation is a write operation.

25. The method of claim 22, wherein said output location is a file included in a file system.

26. A method for detecting a data error associated with a data operation comprising:
    issuing a request for a data operation in connection with a target location;
    determining if said data operation is associated with an output area of said target location having checksumming enabled;

obtaining a checksum value at a first point in an upper portion of a calling chain of drivers if said checksumming is enabled;

notifying a lower filter driver at a point below said first point that checksumming is enabled for said data operation and said associated output area;

forming a command data block in connection with said data operation by said lower filter driver, said command data block including a vendor-unique command in accordance with a first protocol and including a checksum value in accordance with data associated with said data operation; and modifying a standard command included in said command data block to said vendor-unique command, said standard command being in accordance with said first protocol and not having an associated checksum value.

27. The method of claim 26, wherein said standard command is a write command and said vendor-unique command is a vendor-defined write command having an associated checksum value as a parameter.

28. A computer program product for detecting a data error associated with a data operation comprising machine executable code included on a computer readable medium, said computer program product including machine executable code for:

issuing, by an application, a request for a data operation in connection with a device;

determining if said data operation is a write operation having checksumming enabled for a file associated with said write operation; and forming a data packet that includes a checksum and an associated data command if said data operation is a write operation having checksumming enabled, said data packet being formed by communicating said request through a calling chain, said calling chain including calls made using drivers and a file system, said drivers including a first driver and a second driver, a first call being made from said first driver to communicate said checksum for use by said second driver, a second call, different from said first call, being made to said second driver after said file system has been invoked in said calling chain, said second call using said checksum from said first call to include said checksum in said data packet;

receiving said data packet at a target location;

performing, at said target location, a checksum data validation using said checksum and data included in said data packet prior to performing said write operation; and upon determining an error in said checksum data validation, notifying an issuing host.

29. The computer program product of claim 28, further comprising machine executable code for:

performing said write operation of said data included in said data packet when there is a checksum data validation error.

30. The computer program product of claim 28, further comprising:

machine executable code for, upon determining an error in said checksum validation, returning an error to said issuing host without performing a write operation of said data included in said packet.

31. The computer program product of claim 30, further comprising machine executable code for:

issuing another write operation of said data upon said error being received by said issuing host.

32. The computer program product of claim 28, wherein said first and second drivers are filter drivers, and the computer program product further includes:

using said first filter driver to obtain said checksum.

33. The computer program product of claim 32, further comprising machine executable code for:

calculating said checksum by said first filter driver.

34. The computer program product of claim 32, wherein said first filter driver obtains said checksum from another routine not included in said first filter driver.

35. The computer program product of claim 32, further comprising machine executable code for:

associating a packet identifier with said data packet;

passing, by said first filter driver, said packet identifier and checksum for use by said second filter driver; and storing said checksum.

36. The computer program product of claim 35, further comprising machine executable code for:

determining, by said second filter driver, if said data operation is a write request with checksumming enabled having a packet identifier matching one previously passed by said first filter; and modifying said data packet associated with said data operation to specify a vendor-defined write request rather than a standard write request.

37. The computer program product of claim 32, further comprising machine executable code for:

returning an error to said issuing application, said error being sent to said issuing application on a return path through said plurality of drivers.

38. The computer program product of claim 37, wherein said issuing application executes in user mode and the computer program product further includes machine executable code for:

passing said data operation as a request to a data request manager that executes in kernel mode.

39. The computer program product of claim 37, wherein said plurality of drivers execute in kernel mode.

40. The computer program product of claim 36, wherein said standard write request is in accordance with a predefined standard.

41. The computer program product of claim 40, wherein said issuing host is executing in a windows-based operating system and said predefined standard is a small computer system interface standard.

42. The computer program product of claim 28, further comprising machine executable code for:

forming said checksum from one or more checksum values corresponding to data included in said data packet.

43. The computer program product of claim 42, wherein said data corresponds to all data of an original data buffer associated with said data operation.

44. A computer program product for detecting a data error associated with a data operation comprising machine executable code included on a computer readable medium, said computer program product including machine executable code for:

issuing, by an application, a request for a data operation in connection with a device;

determining if said data operation is a write operation having checksumming enabled for a file associated with said write operation; and forming a data packet that includes a checksum and an associated data command if said data operation is a write operation having checksumming enabled;

receiving said data packet at a target location;

performing, at said target location, a checksum data validation using said checksum and data included in said data packet prior to performing said write operation;

upon determining an error in said checksum data validation, notifying an issuing host; and forming said checksum from one or more checksum values corresponding to data included in said data packet, wherein said machine executable code forming said checksum is included in a lower filter driver, said data included in said data packet corresponds to a fragment of said original data buffer associated with said data operation, and the computer program product further comprising machine executable code for:

forming a plurality of fragments of said original data buffer by a file system, said fragment being one of said plurality of fragments, each of said plurality of fragments having a fragment identifier.

45. The computer program product of claim 44, further comprising machine executable code for:

determining, by an upper filter driver, said one or more checksum values, each of said one or more checksum values corresponding to a portion of an original data buffer received by said upper filter driver; and determining, by said upper filter driver if checksumming is enabled for said write operation associated with said original data buffer.

46. The computer program product of claim 45, further comprising machine executable code for:

communicating to said lower filter driver an identifier and said one or more checksum values associated with said original data buffer if checksumming is enabled for said original data buffer;

receiving by said lower filter driver said data packet for performing a write operation using said fragment having a first fragment identifier; and determining, by said lower filter driver using said fragment identifier and said identifier, whether checksumming is enabled for said fragment.

47. The computer program product of claim 46, wherein, upon determining that checksumming is enabled for said fragment by said lower filter driver, the computer program product further comprising machine executable code for:

determining which of said one or more checksum values correspond to data included in said fragment from said original data buffer;

modifying said data packet to specify a vendor-defined write request rather than a standard write request; and forming said checksum by performing a logical exclusive-OR operation of said one or more checksum values corresponding to said fragment.

48. A computer program product for detecting a data error associated with a data operation comprising machine executable code included on a computer readable medium, said computer program product including machine executable code for:

issuing a request for a data operation in connection with a target location;

determining if said data operation is associated with an output area of said target location having checksumming enabled;

obtaining a checksum value at a first point in an upper portion of a calling chain of drivers if said checksumming is enabled;

notifying a lower filter driver at a point below said first point that checksumming is enabled for said data operation and said associated output area, said notifying including performing a first call included in said calling chain to communicate said checksum value for use by said lower filter driver at a second later point in the calling chain; and forming a command data block in connection with said data operation, said forming including a second call in said calling chain to said lower filter driver, said second call being different than said first call, and as part of processing of said second call, said lower filter driver including in said command data block a vendor-unique command in accordance with a first protocol and including a checksum value from said first call in accordance with data associated with said data operation.

49. The computer program product of claim 48 wherein said target location is a data storage system.

50. The computer program product of claim 48 wherein said data operation is a write operation.

51. The computer program product of claim 48, wherein said output location is a file included in a file system.

52. A computer program product for detecting a data error associated with a data operation comprising machine executable code included on a computer readable medium, said computer program product including machine executable code for:

issuing a request for a data operation in connection with a target location;

determining if said data operation is associated with an output area of said target location having checksumming enabled;

obtaining a checksum value at a first point in an upper portion of a calling chain of drivers if said checksumming is enabled;

notifying a lower filter driver at a point below said first point that checksumming is enabled for said data operation and said associated output area;

forming a command data block in connection with said data operation by said lower filter driver, said command data block including a vendor-unique command in accordance with a first protocol and including a checksum value in accordance with data associated with said data operation; and modifying a standard command included in said command data block to said vendor-unique command, said standard command being in accordance with said first protocol and not having an associated checksum value.

53. The computer program product of claim 52, wherein said standard command is a write command and said vendor-unique command is a vendor-defined write command having an associated checksum value as a parameter.

* * * * *